(12) United States Patent
Yamashita et al.

(10) Patent No.: US 11,401,188 B2
(45) Date of Patent: Aug. 2, 2022

(54) SLUDGE DEHYDRATION SYSTEM AND SLUDGE DEHYDRATION METHOD

(71) Applicant: ISHIGAKI COMPANY LIMITED, Tokyo (JP)

(72) Inventors: Manabu Yamashita, Kagawa (JP); Masakazu Morita, Kagawa (JP); Hiroyuki Mino, Kagawa (JP); Yasuaki Nishihara, Kagawa (JP); Atsushi Yanai, Kagawa (JP); Ryosuke Tamauchi, Kagawa (JP); Yasutaka Suetsugu, Kagawa (JP); Masayoshi Katayama, Kagawa (JP)

(73) Assignee: ISHIGAKI COMPANY LIMITED, Tokyo (JP)

( * ) Notice: Subject to any disclaimer, the term of this patent is extended or adjusted under 35 U.S.C. 154(b) by 975 days.

(21) Appl. No.: 15/951,716

(22) Filed: Apr. 12, 2018

(65) Prior Publication Data

US 2018/0230036 A1 Aug. 16, 2018

Related U.S. Application Data

(60) Division of application No. 14/989,362, filed on Jan. 6, 2016, now Pat. No. 9,975,798, which is a (Continued)

(30) Foreign Application Priority Data

| Jul. 26, 2013 | (JP) | ................................. 2013-155125 |
| Sep. 12, 2013 | (JP) | ................................. 2013-189126 |
| Sep. 12, 2013 | (JP) | ................................. 2013-189127 |

(51) Int. Cl.
C02F 11/14 (2019.01)
C02F 11/147 (2019.01)
(Continued)

(52) U.S. Cl.
CPC ........ *C02F 11/147* (2019.01); *B01D 21/2488* (2013.01); *B01D 21/262* (2013.01);
(Continued)

(58) Field of Classification Search
CPC ... B01D 21/2488; B01D 21/262; C02F 11/02; C02F 11/121; C02F 11/125; C02F 11/14;
(Continued)

(56) References Cited

U.S. PATENT DOCUMENTS 6,206,199 B1 * 3/2001 Kurtz ..................... D21B 1/026
209/3
9,169,597 B2 10/2015 Aharon
(Continued)

FOREIGN PATENT DOCUMENTS

| JP | 61-216897 | 9/1986 |
| JP | 61-268400 | 11/1986 |

(Continued)

OTHER PUBLICATIONS

Official Action in counterpart Canadian Patent Application No. 2,970,289, dated Oct. 7, 2019 (in English).
(Continued)

*Primary Examiner* — Chester T Barry
(74) *Attorney, Agent, or Firm* — Greenblum & Bernstein, P.L.C.

(57) ABSTRACT

A sludge dehydration method includes a recovery process of recovering specific material as a dewatering aid from sludge generated in a sewage treatment process and a dewatering process of performing solid-liquid separation on sludge in which the dewatering aid recovered in the recovery process and dewatering target sludge are mixed.

19 Claims, 16 Drawing Sheets

Related U.S. Application Data continuation of application No. PCT/JP2014/066435, filed on Jun. 20, 2014.

(51) Int. Cl.
| | |
|---|---|
| *C02F 11/121* | (2019.01) |
| *B01D 21/24* | (2006.01) |
| *B01D 21/26* | (2006.01) |
| *C02F 11/125* | (2019.01) |
| *C02F 11/02* | (2006.01) |
| *C02F 1/00* | (2006.01) |
| *C02F 3/12* | (2006.01) |
| *C02F 11/04* | (2006.01) |
| *C02F 11/123* | (2019.01) |

(52) U.S. Cl.
CPC ............ *C02F 11/02* (2013.01); *C02F 11/121* (2013.01); *C02F 11/125* (2013.01); *C02F 1/008* (2013.01); *C02F 3/1257* (2013.01); *C02F 3/1268* (2013.01); *C02F 11/04* (2013.01); *C02F 11/123* (2013.01); *C02F 2209/001* (2013.01); *C02F 2209/10* (2013.01); *C02F 2209/42* (2013.01); *C02F 2303/18* (2013.01); *C02F 2303/26* (2013.01); *Y02W 10/10* (2015.05)

(58) Field of Classification Search
CPC ...... C02F 1/008; C02F 3/1257; C02F 3/1268; C02F 11/04; C02F 11/123; C02F 2209/001; C02F 2209/10; C02F 2209/42; C02F 2303/18; C02F 2303/26; Y02W 10/10
See application file for complete search history.

(56) References Cited

U.S. PATENT DOCUMENTS

| 9,975,798 | B2* | 5/2018 | Yamashita | .............. C02F 11/14 |
| 2006/0118667 | A1 | 6/2006 | Yamada | |
| 2008/0314841 | A1 | 12/2008 | Moon | |
| 2009/0281302 | A1 | 11/2009 | Aharon | |
| 2016/0115065 | A1* | 4/2016 | Yamashita | .............. C02F 11/14 |
| | | | | 210/767 |
| 2016/0115066 | A1* | 4/2016 | Yamashita | ........... B01D 21/262 |
| | | | | 210/806 |

FOREIGN PATENT DOCUMENTS

| JP | S61268400 A * | 11/1986 | .............. C02F 11/14 |
| JP | 04-215811 | 8/1992 | |
| JP | H04215811 A * | 8/1992 | .............. B01D 29/01 |
| JP | HO4215811 | 8/1992 | |
| JP | 06-29797 | 4/1994 | |
| JP | 11-216458 | 8/1999 | |
| JP | H11216458 A * | 8/1999 | .............. B01D 29/11 |
| JP | 2000-093703 | 4/2000 | |
| JP | 2000-513267 | 10/2000 | |
| JP | 2002-346599 | 12/2002 | |
| JP | 2003-159505 | 6/2003 | |
| JP | 2004-195280 | 7/2004 | |
| JP | 2005-034801 | 2/2005 | |
| JP | 2005-248337 | 9/2005 | |
| JP | 2005248337 A * | 9/2005 | .............. B09B 3/00 |
| JP | 2008-532743 | 8/2008 | |
| JP | 2010-110742 | 5/2010 | |
| JP | 2012-071296 | 4/2012 | |
| JP | 2012-206018 | 10/2012 | |
| JP | 2012206018 A * | 10/2012 | .............. B09B 5/00 |
| TW | 1294006 | 3/2008 | |
| TW | 1386376 | 2/2013 | |
| WO | 2005/105680 | 11/2005 | |

OTHER PUBLICATIONS

Office Action issued in Canada Patent Appl. No. 2,970,289, dated Dec. 28, 2018.
Office Action issued in European Patent Office (EPO) Counterpart Patent Appl. No. 14829186.7, dated Jul. 25, 2018.
International Search Report issued in Patent Application No. PCT/JP2014/066435, dated Sep. 16, 2014.
Office Action issued in Taiwan Counterpart Patent Appl. No. 103121710, dated Aug. 8, 2017.
Office Action issued in Canada Patent Appl. No. 2917488, dated Dec. 29, 2016.
Office Action issued in European Patent Office (EPO) Counterpart Patent Appl. No. 14829186.7, dated Jul. 14, 2017.
Office Action issued in Canada Counterpart Patent Appl. No. 2917488, dated Jul. 14, 2017.
Office Action issued in European Patent Office (EPO) Counterpart Patent Appl. No. 1657337.3, dated Jul. 14, 2017.
Office Action issued in Canada Patent Appl. No. 2,970,289, dated May 9, 2018.
Office Action issued in EPO Patent Appl. No. 14829186.7, dated Apr. 12, 2018.
Search Report issued in EPO Patent Appl. No. 16157337.3, dated Jul. 18, 2016.
Search Report issued in EPO Patent Appl. No. 14829186.7, dated Sep. 30, 2016.

* cited by examiner

FIG. 21

| | | Sat. | Sun. | Mon. | Tue. | Wed. | Thu. | Fri. |
|---|---|---|---|---|---|---|---|---|
| PRIMARY SEDIMENTATION TANK | AMOUNT OF SLUDGE TAKEN OUT(m3/d) | 60 | 60 | 70 | 70 | 70 | 70 | 70 |
| | CONCENTRATION OF SLUDGE TAKEN OUT(%) | 0.5% | 0.5% | 1.0% | 1.1% | 1.5% | 1.2% | 1.0% |
| | AMOUNT OF SOLIDS IN SLUDGE TAKEN OUT(t-DS/d) | 0.3 | 0.3 | 0.7 | 0.77 | 1.05 | 0.84 | 0.7 |
| | DEWATERING AID RECOVERY TIME (h/d) | 24 | 24 | 24 | 24 | 24 | 24 | 24 |
| | RECOVERY AMOUNT(t-DS/d) | 0.09 | 0.09 | 0.22 | 0.24 | 0.33 | 0.26 | 0.22 |
| DIGESTER TANK | GENERATED AMOUNT OF DIGESTED SLUDGE(m3/d) | 0 | 0 | 50 | 55 | 45 | 60 | 40 |
| | CONCENTRATION OF DIGESTED SLUDGE TAKEN OUT(%) | | | 2.0% | 2.0% | 2.0% | 2.0% | 2.0% |
| | AMOUNT OF SOLIDS IN DIGESTED SLUDGE TAKEN OUT(t-DS/d) | 0 | 0 | 1 | 1.1 | 0.9 | 1.2 | 0.8 |
| DEWATERER | DEWATERING OPERATION TIME (h/d) | 0 | 0 | 8 | 8 | 8 | 8 | 8 |
| | SUPPLY AMOUNT OF DEWATERING AID(t-DS/d) | | | 0.30 | 0.33 | 0.27 | 0.36 | 0.24 |
| | SUPPLY AMOUNT OF DEWATERING AID(kg-DS/h) | | | 37.5 | 41.3 | 33.8 | 45.0 | 30.0 |
| | AID ADDITION RATE(%) | | | 30% | 30% | 30% | 30% | 30% |

SLUDGE DEHYDRATION SYSTEM AND SLUDGE DEHYDRATION METHOD

CROSS REFERENCE TO RELATED APPLICATION

This application is a Divisional of U.S. application Ser. No. 14/989,362, filed on Jan. 6, 2016 now U.S. Pat. No. 9,975,798, which is a Continuation of PCT Application No. PCT/JP2014/066435, filed on Jun. 20, 2014, and claims the priorities of Japanese Patent Applications Nos. 2013-155125 (filed: Jul. 26, 2013), 2013-189126 (filed: Sep. 12, 2013) and 2013-189127 (filed: Sep. 12, 2013), the content of which is incorporated herein by reference.

BACKGROUND

Technical Field

The disclosure relates to a recovery device and a recovery method for recovering a specific material as a dewatering aid from sludge, and a sludge dehydration system and a sludge dehydration method in which the dewatering aid recovered from sludge is added to difficult-to-dewater sludge to dewater the sludge.

Related Art

Difficult-to-dewater sludge generated in sewage treatment plants or the like is low in fiber components and exhibits poor dewaterability. Dewatering is performed on difficult-to-dewater sludge such as digested sludge in which organic matter (fiber components and the like) in sludge is decomposed by the action of anaerobic bacteria and excess sludge in which the organic matter is converted to microorganisms. Accordingly, fiber components are reduced in sludge before dewatering. Fiber components in sludge function as flocculation nuclei, and have the effect of forming waterways in flocs during dewatering. Thus, sludge containing reduced fiber components cannot appropriately flocculate, and therefore exhibits poor dewaterability.

There is a method in which difficult-to-dewater sludge is dewatered by mixing fibrous matter or plant material such as sawdust or chaff as a dewatering aid into the difficult-to-dewater sludge to compensate fiber components reduced by the decomposition of sludge. The addition of even a small amount of fibrous matter used as a dewatering aid enables a dewatered cake with a low water content to be stably obtained, and, in the case of pressure dewatering, improves the detachability of a dewatered cake. However, in the case of this method, since a large amount of dewatering aid must be prepared and supplied, running cost increases, and facilities for stockpiling and supplying the dewatering aid must be installed.

To cope with this, Japanese Patent Application Publication No. S61-268400 discloses a technique of separating and recovering fiber components in raw sludge generated in a primary sedimentation tank of a sludge treatment process, and adding the fiber components to difficult-to-dewater sludge such as excess sludge or digested sludge.

Published Japanese Translation of PCT International Application No. 2000-513267 discloses a recovery device in which different components in a multiple layer material are crushed into small pieces with opposed disks rotating relative to each other and in which readily pulped pieces of materials are separated with a perforated drum, and the remaining small pieces are discharged from one end of the drum with the aid of a screw feeder in the drum in a later stage.

In Japanese Patent Application Publication No. 2012-71296, to lower the water content of a dewatered cake, a dewatering aid using synthetic fibers is prepared by carefully selecting or designing a material, diameter, length, and shape, and is added as an optimum dewatering aid to sludge.

Japanese Patent Application Publication No. 2012-206018 discloses a sludge management system for managing a sludge dewatering process in which sludge supplied to a dewatering facility is dewatered with the addition of a dewatering aid.

SUMMARY

In the technique of Japanese Patent Application Publication No. S61-268400, since fiber components are recovered from sludge in a treatment plant, a dewatering aid does not need to be additionally prepared, and both running cost and facilities are not different from those for a normal process. However, a separating apparatus using a mesh of a screen or vibrating sieve such as disclosed in Japanese Patent Application Publication No. S61-268400 cannot separate matters which are not suitable for a dewatering aid, such as easily decomposable organic matter originating from food residues and entangled with fiber components (hardly decomposable organic matter), and recovers such matters together with fiber components. Accordingly, if fibers entangled with easily decomposable organic matters largely composed of moisture are added as a dewatering aid, the volume of a dewatered cake increases, and disposal cost rises. Moreover, since easily decomposable organic matter decomposes and decays after dewatering, a dewatering aid before addition and a dewatered cake after addition cannot be preserved for a long period of time. A specific method for recovering only fiber components effective as a dewatering aid is not disclosed, and it is difficult to recover only necessary fiber components.

The technique of Published Japanese Translation of PCT International Application No. 2000-513267 is intended to recover various components of a multiple layer material including paper, plastic, and aluminum foil, and provides an apparatus for separating and recovering readily pulped (slushed) paper fibers and not-readily pulped solids such as aluminum and plastic. The rotary disks in the earlier stage have the function of crushing multiple layer structures into small pieces, and also have the function of pumping the small pieces together with suspension liquid to a separator. In this technique, treatment target matters are fragmented while extremely small organic matters originating from food residues and entangled with fiber components in sewage are being ground. Accordingly, a gap between the disks needs to be set to be extremely narrow. However, if the gap is set to be narrow, pumping to the separator cannot be performed.

In a perforated drum in the later stage, paper fibers untangled and dispersed in the suspension liquid are separated to the outside of the drum through perforations, and the remaining small pieces (aluminum, plastic, and the like) in the drum are transported to and discharged from the other end. This technique can be established thanks to the presence of small pieces (aluminum, plastic, and the like) having sizes above a certain level which do not become slush in immersion in the suspension liquid. In this technique, it is difficult to separate fiber components contained in sludge in a sewage treatment plant from fine easily decomposable organic matters originating from food residues and entangled with the fiber components. Moreover, when fiber components are used as a dewatering aid, the step of extracting only fiber components from the suspension liquid is additionally needed.

In Japanese Patent Application Publication No. 2012-71296, a dewatering aid using synthetic fibers is added to sludge as an optimum dewatering aid. However, in the case where synthetic fibers are used as a dewatering aid, a dewatering aid must always be prepared and supplied. Accordingly, running cost increases due to the use of a dewatering aid, and facilities for stockpiling and supplying the dewatering aid must be installed because a large amount of dewatering aid is added.

In the technique of Japanese Patent Application Publication No. 2012-206018, based on sludge information of a treatment plant and production information of an aid supply device installed in an office or the like and configured to produce a dewatering aid by fiberizing unnecessary paper and the like, physical distribution information for supplying the dewatering aid to a dewatering facility is managed, and an appropriate amount of dewatering aid is flexibly supplied from the dewatering aid supply device to the dewatering facility at an appropriate time. However, the aid supply device for producing the dewatering aid by dissolving paper and the like needs to be installed in the office or the like, and a plurality of offices need to be equipped with aid supply devices because the discharged amount of unnecessary paper and the like as materials for the dewatering aid is not constant. Moreover, physical distribution means for transporting the dewatering aid from the office to the treatment plant is needed.

The disclosure relates to a recovery device and a recovery method for selectively separating and recovering, from sludge flowing into a sewage treatment plant, only fiber components having a specific properties useful as a dewatering aid in dewatering difficult-to-dewater sludge, and to a sludge dehydration system and a sludge dehydration method which can utilize the recovered fiber components as a dewatering aid for difficult-to-dewater sludge and which can keep the stored amount of the dewatering aid to a minimum.

In fiber components as a dewatering aid which mainly act as flocculation nuclei, performance as flocculation nuclei varies according to properties of the fiber components. Accordingly, using a dewatering aid having the specific properties greatly improves dewaterability. Thus, adding an appropriate dewatering aid to sludge causes the sludge to form flocs, and improves the dewaterability of the sludge.

A recovery device in accordance with some embodiments of the present invention is configured to recover specific material as a dewatering aid from sludge generated in a sewage treatment process, the recovery device including: a grinder configured to fragment a solid in the sludge to obtain prepared sludge; a separator configured to separate hardly decomposable organic matter and easily decomposable organic matter from the prepared sludge; and an extractor configured to continuously extract hardly decomposable organic matter having specific properties as the dewatering aid from the hardly decomposable organic matter separated by the separator.

With the above-described configuration, only matters useful as a dewatering aid can be selectively recovered from sludge flowing into a sewage treatment plant, and can be effectively utilized to dewater difficult-to-dewater sludge in a later stage.

The recovery device may further include: a separation tank provided below the separator and configured to collect the easily decomposable organic matter; and a return pipe connected to the separation tank and configured to return the easily decomposable organic matter collected in the separation tank to a biological treatment tank of a sewage treatment plant.

The above-described configuration can reduce a reaction period in a biological treatment step in a treatment plant, and contributes to the improvement of the processing efficiency of the entire treatment plant.

The grinder may include: a stationary disk; and a rotary disk rotatably arranged to face the stationary disk and configured to define a recessed portion together with the stationary disk, the rotary disk having a supply port in communication with the recessed portion. The stationary disk and the rotary disk may be arranged with a gap interposed between outer circumferential edges of the stationary disk and the rotary disk. The recovery device may further include a supply tube connected to the supply port and configured to supply the sludge to the recessed portion.

With the above-described configuration, sludge can be continuously fragmented, and materials useful as a dewatering aid can also be recovered from easily decomposable organic matter.

The grinder may include: a cylindrical casing having one end closed; a cylindrical screen arranged in the casing; and a sliding member configured to rotate in sliding contact with an inner wall of the cylindrical screen. The recovery device may include: a supply tube connected to a center of an opening portion of the cylindrical screen and configured to supply the sludge to an inside of the cylindrical screen; and a transfer tube connected to the casing and configured to transfer the prepared sludge to the separator.

The separator may include a rotatable cylinder type screen. The extractor may include a helically wound screw impeller arranged in the screen.

The screen may include an extraction portion provided at an end portion of the screen and configured to extract the hardly decomposable organic matter having the specific properties, and a portion of the screen near the extraction portion may have a diameter gradually decreasing toward the extraction portion.

With the above-described configuration, hardly decomposable organic matter can be continuously separated and recovered. Forming into a gradually-decreasing conical shape a portion of the separator which is near the extraction portion can improve the action by which a slight amount of foreign substances lying deeply between fibers and small fiber components having sizes under the range of recovery are received by the separation tank together with water by gravitational separation.

The separator may include: a plurality of rolls; and an endless belt travelably wound around the plurality of rolls and having a large number of small holes. The extractor may include a scraper arranged behind a filtering surface.

A filtering surface including a supply portion of the separator may be immersed in immersion water stored in the separation tank.

In the above-described configuration, since entangled materials are untangled and dispersed in the separation step, the separation effect is improved.

The recovery device may further include an injection device configured to inject high-pressure water onto a filtering surface of the separator.

The separator may include: a cylindrical screen; a plurality of rolling elements mixed into the cylindrical screen and configured to roll while being transported; a rolling element tank configured to recover the rolling elements; and a return unit configured to return the rolling elements recovered in the rolling element tank to a supply portion of the separator from the rolling element tank through a circulation pipe.

With the above-described configuration, the functions of preventing the entanglement of materials in the separation step and untangling prepared sludge are provided, and therefore separation efficiency is improved.

The difficult-to-dewater organic matter may be fibrous matter, and the hardly decomposable organic matter having the specific properties may be fiber components having fiber lengths of 0.1 mm to 5 mm and fiber diameters of 1 μm to 50 μm.

With the above-described configuration, mixing with difficult-to-dewater sludge can cause firm flocs to be formed, and a dewatered cake with a low water content can be produced by the dewaterer in a later stage.

A recovery method in accordance with some embodiments of the present invention is a recovery method of recovering specific material as a dewatering aid from sludge generated in a sewage treatment process, the recovery method including: a preparation step of fragmenting a solid in the sludge to obtain prepared sludge; a separation step of separating hardly decomposable organic matter and easily decomposable organic matter from the prepared sludge; and an extraction step of continuously extracting hardly decomposable organic matter having specific properties as the dewatering aid from the hardly decomposable organic matter separated in the separation step.

The difficult-to-dewater organic matter may be fibrous matter, and the hardly decomposable organic matter having the specific properties may be fiber components having fiber lengths of 0.1 mm to 5 mm and fiber diameters of 1 μm to 50 μm.

With the recovery device and the recovery method according to the above-described embodiment, the steps of preparing, separating, and extracting sludge can be continuously performed, and a very compact system can be obtained if devices are integrated. Difficult-to-dewater organic matter in sludge is effectively utilized as a dewatering aid for a sludge dewatering process in a treatment system, and easily decomposable organic matter is returned to the biological treatment tank. Accordingly, a dewatered cake with a low water content can be produced, and a reaction period in the biological treatment step in the treatment plant can be reduced. Moreover, the recovery device and the recovery method can contribute to the processing efficiency of the entire treatment plant. Running cost for additionally purchasing a dewatering aid is not required, and facilities for stockpiling and supplying a dewatering aid are not required, either. Moreover, difficult-to-dewater organic matter extracted as a dewatering aid does not contain easily decomposable organic matter, and therefore can be preserved for a long period of time.

A sludge dehydration system in accordance with some embodiments of the present invention includes: a recovery device configured to recover specific material as a dewatering aid from sludge generated in a sewage treatment process; and a dewaterer configured to perform solid-liquid separation on sludge in which the dewatering aid recovered by the recovery device and dewatering target sludge are mixed.

The recovery device may include: a grinder configured to fragment a solid in the sludge to obtain prepared sludge; a separator configured to separate hardly decomposable organic matter and easily decomposable organic matter from the prepared sludge; and an extractor configured to continuously extract hardly decomposable organic matter having specific properties as the dewatering aid from the hardly decomposable organic matter separated by the separator.

The sludge dehydration system may further include a recovery tank configured to store the dewatering aid extracted by the extractor.

The dewatering target sludge may be one of OD excess sludge or digested sludge being sludge in which fiber components are reduced.

The sludge dehydration system may further include: a supply device configured to supply the dewatering aid to the dewatering target sludge; and a control device configured to adjust a supply amount of the dewatering aid supplied by the supply device. The control device may be configured to: calculate a predicted total recovery amount of the dewatering aid to be recovered in a continuous predetermined period set in advance by the recovery device; calculate a predicted total sludge amount of the dewatering target sludge to be dewatered by the dewaterer in the continuous predetermined period set in advance; and calculate the supply amount for distributedly supplying the dewatering aid of the calculated predicted total recovery amount to the dewatering target sludge of the calculated predicted total sludge amount.

In the above-described configuration, while a recovery amount of a dewatering aid in a predetermined period is predicted, a supply amount is calculated based on the predicted recovery amount and the operating time of the dewaterer. Accordingly, a stable supply amount can be supplied to difficult-to-dewater sludge while variation in the recovery amount is dealt with.

The sludge dehydration system may further include: a first measuring device configured to measure an actual recovery amount of the dewatering aid recovered by the recovery device; and a second measuring device configured to measure an actual sludge amount of the dewatering target sludge. The control device may be configured to: calculate the predicted total recovery amount based on the actual recovery amount and sludge information; and calculate the predicted total sludge amount based on the actual sludge amount and the sludge information.

The above-described configuration enables accurate prediction.

The control device may be configured to calculate the supply amount for evenly distributing the predicted total recovery amount to the predicted total sludge amount.

The control device may be configured to calculate the supply amount for evenly distributing the actual recovery amount to the actual sludge amount.

This enables the production of a dewatered cake with a low water content. Moreover, a similar effect can also be obtained by calculating a supply amount for evenly distributing an actual recovery amount to an actual sludge amount.

The difficult-to-dewater organic matter may be fibrous matter, and the hardly decomposable organic matter having the specific properties may be fiber components having fiber lengths of 0.1 mm to 5 mm and fiber diameters of 1 μm to 50 μm.

A sludge dehydration method in accordance with some embodiments of the present invention includes: a recovery process of recovering specific material as a dewatering aid from sludge generated in a sewage treatment process; and a dewatering process of performing solid-liquid separation on sludge in which the dewatering aid recovered in the recovery process and dewatering target sludge are mixed.

With the above-described configuration, dewaterability can be greatly improved by recovering fiber components having properties optimum for a dewatering aid.

The recovery process may include: a preparation step of fragmenting a solid in the sludge to obtain prepared sludge; a separation step of separating hardly decomposable organic matter and easily decomposable organic matter from the prepared sludge; and an extraction step of continuously extracting hardly decomposable organic matter having specific properties as the dewatering aid from the hardly decomposable organic matter separated in the separation step.

The preparation step may include performing preparation to obtain the prepared sludge having properties allowing fiber components being the hardly decomposable organic matter and the easily decomposable organic matter to be separated from each other.

The preparation step may include performing preparation to obtain the prepared sludge by adding dilution water to the solid.

The preparation step may include performing preparation to obtain the prepared sludge by crushing the solid into fine pieces.

The above-described configuration facilitates the separation of easily decomposable organic matter and fiber components being hardly decomposable organic matter.

The separation step may include washing the solid prepared in the preparation step with washing water and removing fiber components smaller than the hardly decomposable organic matter having the specific properties.

With the above-described configuration, only fiber components having specific properties can be reliably recovered from sewage flowing into a sewage treatment plant.

The recovery process may further include, in a stage before the preparation step, a step of removing foreign substances larger than the hardly decomposable organic matter having the specific properties.

With the above-described configuration, matters interfering with the preparation step and the separation step can be removed.

The hardly decomposable organic matter having the specific properties may be fiber components having fiber lengths of 0.1 mm to 5 mm and fiber diameters of 1 μm to 50 μm.

The above-described configuration allows difficult-to-dewater sludge to form firm flocs, and improves dewaterability.

The dewatering target sludge may be one of OD excess sludge or digested sludge being sludge in which fiber components are reduced.

The sludge dehydration method may further include a supply amount calculation process. The supply amount calculation process may include steps of: calculating a predicted total recovery amount of the dewatering aid to be recovered in a continuous predetermined period set in advance in the recovery process; calculating a predicted total sludge amount of the dewatering target sludge to be dewatered in the continuous predetermined period set in advance in the dewatering process; and calculating a supply amount for distributedly supplying the dewatering aid of the calculated predicted total recovery amount to the dewatering target sludge of the calculated predicted total sludge amount.

In the above-described configuration, the period of storage is short, the supply amount does not extremely vary, and a dewatered cake with a stable low water content can be produced.

In the sludge dehydration method according to the above-described embodiment, only fiber components (hardly decomposable organic matter) suitable as a dewatering aid are extracted from sewage flowing into a sewage treatment plant. The extracted fiber components are added as a dewatering aid to unflocculated difficult-to-dewater sludge to contribute to the production of firm flocs. Easily decomposable organic matter returned to the anaerobic digester tank contributes to the improvement of sludge decomposition efficiency.

By selectively separating and recovering only predetermined fiber components when fiber components are extracted, fiber components having properties optimum as a dewatering aid can be recovered and added to difficult-to-dewater sludge. Since a dewatering aid of synthetic fibers additionally prepared is not used, running cost for a dewatering aid is not required. A dewatering aid is recovered in a treatment plant and directly utilized. Accordingly, stockpiling and supplying facilities can be made compact.

In the sludge dehydration system and the sludge dehydration method for sewage sludge according to the above-described embodiment, a dewatering aid is recovered from a sewage treatment process. Thus, a dewatering aid does not need to be additionally purchased, and stock control, supplying facility, and the like are not required, either. Since hardly decomposable organic matter (fibrous matter) is recovered as a dewatering aid in an earlier stage of a sewage treatment process, decomposition efficiency in the digester tank is improved. The recovered dewatering aid is sequentially supplied according to the operating time of the dewaterer. Accordingly, the period of storage becomes short, a facility for storing the dewatering aid can be downsized, and alteration, decay, and odor can be prevented from occurring. Moreover, while a recovery amount of a dewatering aid in a predetermined period is predicted, a supply amount is calculated based on the predicted recovery amount and the operating time of the dewaterer. Accordingly, the supply amount does not extremely vary, and a dewatered cake with a stable low water content can be obtained.

BRIEF DESCRIPTION OF DRAWINGS

FIG. 21 shows data on the recovery of a dewatering aid in a certain sewage treatment plant according to the third embodiment of the present invention.

DETAILED DESCRIPTION

First, a first embodiment of the present invention will be described.

A recovery device 2 used in a method of recovering fibers from sludge, a sludge dehydration system, and a sludge dehydration method according to the first embodiment is intended for use in a sewage treatment plant or the like. The recovery device 2 extracts specific fibrous matter from sludge (including sewage) in an earlier stage of a treatment plant, and adds the fibrous matter as a dewatering aid at the time of dewatering difficult-to-dewater sludge generated in a later stage of the treatment plant, thus improving the dewaterability of difficult-to-dewater sludge. Difficult-to-dewater sludge means sludge which exhibits poor dewaterability due to a great reduction in the content of fiber components acting as flocculation nuclei caused by biological treatment or the like. For example, digested sludge produced in a digester tank 15, OD sludge produced in a reaction tank of an OD process (oxidation ditch system), and the like fall into the category of difficult-to-dewater sludge.

Figure 1:
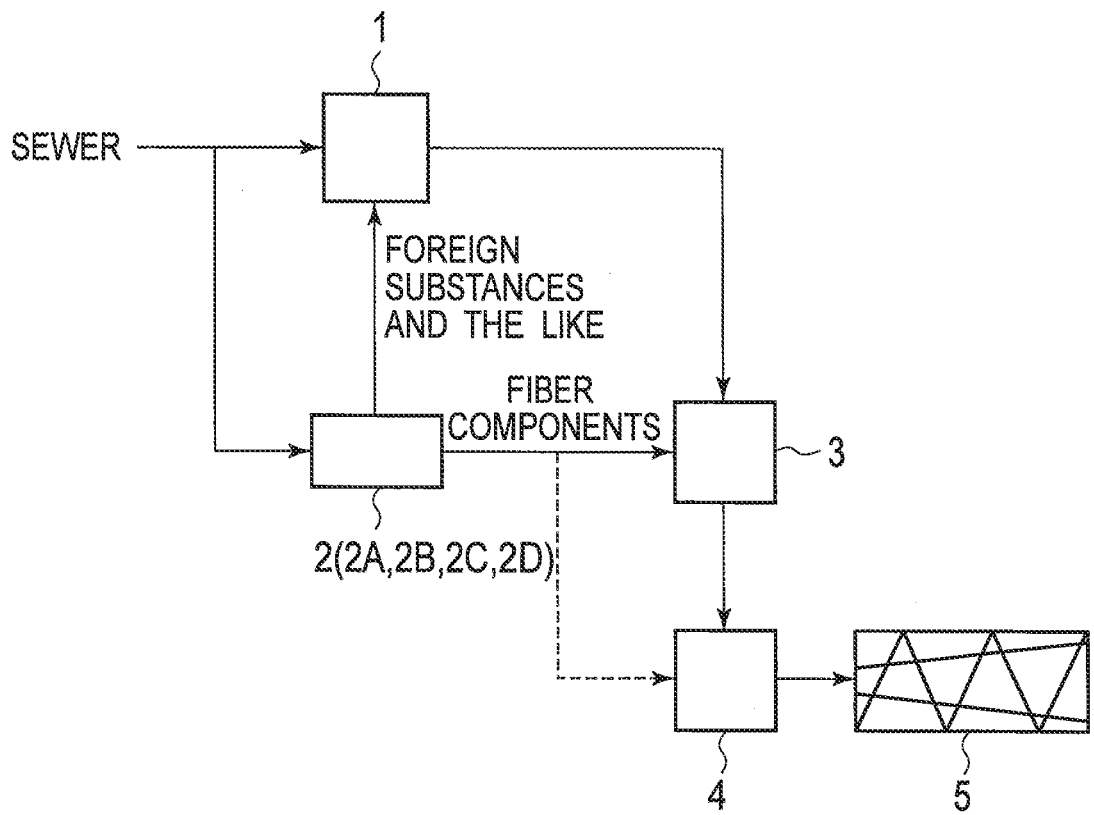
FIG. 1 is a diagram showing a sludge dehydration system and the flow of a sludge dehydration method according to a first embodiment of the present invention.

FIG. 1 is a diagram showing the sludge dehydration system and the flow of the sludge dehydration method according to the first embodiment. This sludge dehydration system includes a biological treatment tank 1 for biologically treating sludge, a recovery device 2 for selectively recovering fiber components in sewage coming from sewers, a mixing tank 3 for mixing the sludge treated in the biological treatment tank 1 and the fiber components recovered by the recovery device 2, a flocculation and mixing tank 4 for adding a flocculant to the sludge mixed with the fiber components in the mixing tank 3, and a dewaterer 5 for performing solid-liquid separation on flocculated sludge produced in the flocculation and mixing tank 4. It should be noted that as indicated by a broken line, fiber components separated and recovered by the recovery device 2 may be sent to the flocculation and mixing tank 4 instead of the mixing tank 3 and added to the sludge simultaneously with a polymer flocculant. The dewaterer 5 may be a publicly known dewaterer such as a screw press, a belt press, or a centrifugal dewaterer.

In the sludge dehydration system and the sludge dehydration method according to the first embodiment, fiber components in sewage flowing into the sewage treatment plant is recovered by the recovery device 2 so that fiber components in sewage may be utilized as a dewatering aid. The fiber components recovered by the recovery device 2 are added to unflocculated difficult-to-dewater sludge and the like to function as flocculation nuclei. Adding a dewatering aid having appropriate properties to sludge causes firm flocs to be formed and improves dewaterability. Accordingly, properties of a dewatering aid suitable for sludge to be treated are selected in advance. In the sludge dehydration system and the sludge dehydration method according to the first embodiment, only fiber components having predetermined properties are recovered and used as a dewatering aid to improve dewaterability.

The dewatering aid recovered from sewage sludge is hardly decomposable organic matter primarily composed of plant-derived fibrous matter. For example, toilet paper dissolved in sewage falls into the category of hardly decomposable organic matter. Moreover, as described previously, difficult-to-dewater sludge means sludge which exhibits poor dewaterability due to a great reduction in the content of fiber components acting as flocculation nuclei caused by biological treatment or the like. For example, digested sludge produced in a digester tank 237, OD excess sludge produced in a reaction tank 219 of an OD process, and the like fall into the category of difficult-to-dewater sludge. Sludge left after the extraction of hardly decomposable organic matter consists principally of easily decomposable organic matter. Easily decomposable organic matter originating from food residues is perishable and cannot be preserved for a long period of time, and is therefore returned to the digester tank 237 and subjected to anaerobic digestion. In the digester tank 237, the amount of hardly decomposable organic matter is small because the dewatering aid has been recovered. Accordingly, a reaction period of a digestion process can be shortened. This contributes to the improvement of the processing efficiency of the entire treatment plant.

It has been found out that for example, utilizing toilet paper formed by plant fibers which fall into the category of hardly decomposable organic matter as a dewatering aid can greatly reduce the water content of a dewatered cake. Accordingly, focusing attention on properties of fibers of toilet paper led to success in reducing the water content by utilizing fiber components having properties equivalent to those of toilet paper as a dewatering aid.

Figure 2:
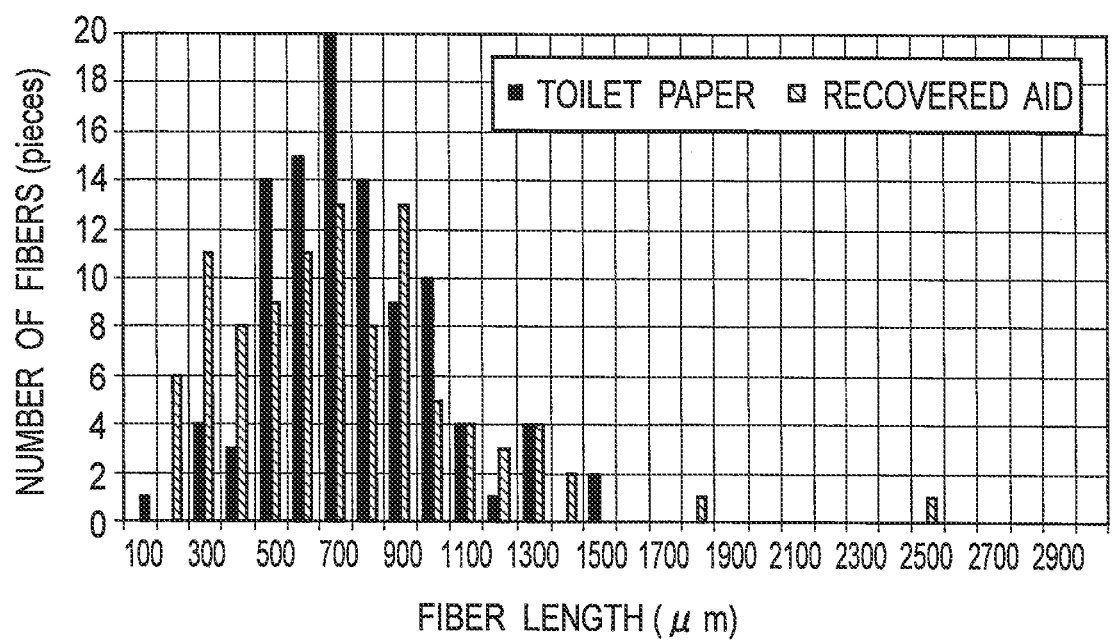
FIG. 2 is a graph for comparing toilet paper and fibers recovered by a recovery device according to any one of first to third embodiments of the present invention.

FIG. 2 is a graph for comparing toilet paper and fibers recovered by the recovery device 2. In the graph, a comparison is made between fiber components obtained by dissolving toilet paper in water and fiber components recovered from the sewage treatment plant by the recovery device 2, with the horizontal axis representing fiber length, the vertical axis representing the number of fibers.

A result of the comparison has revealed that the distribution (fiber length, the number of fibers) of fibers in sewage sludge is very similar to that of toilet paper. Moreover, with regard to properties of recovered fibers, it has been revealed that fiber length is preferably 0.1 mm to 5 mm from the viewpoint of workability at the time of addition to and mixing with sludge and dewatering.

Figure 3:
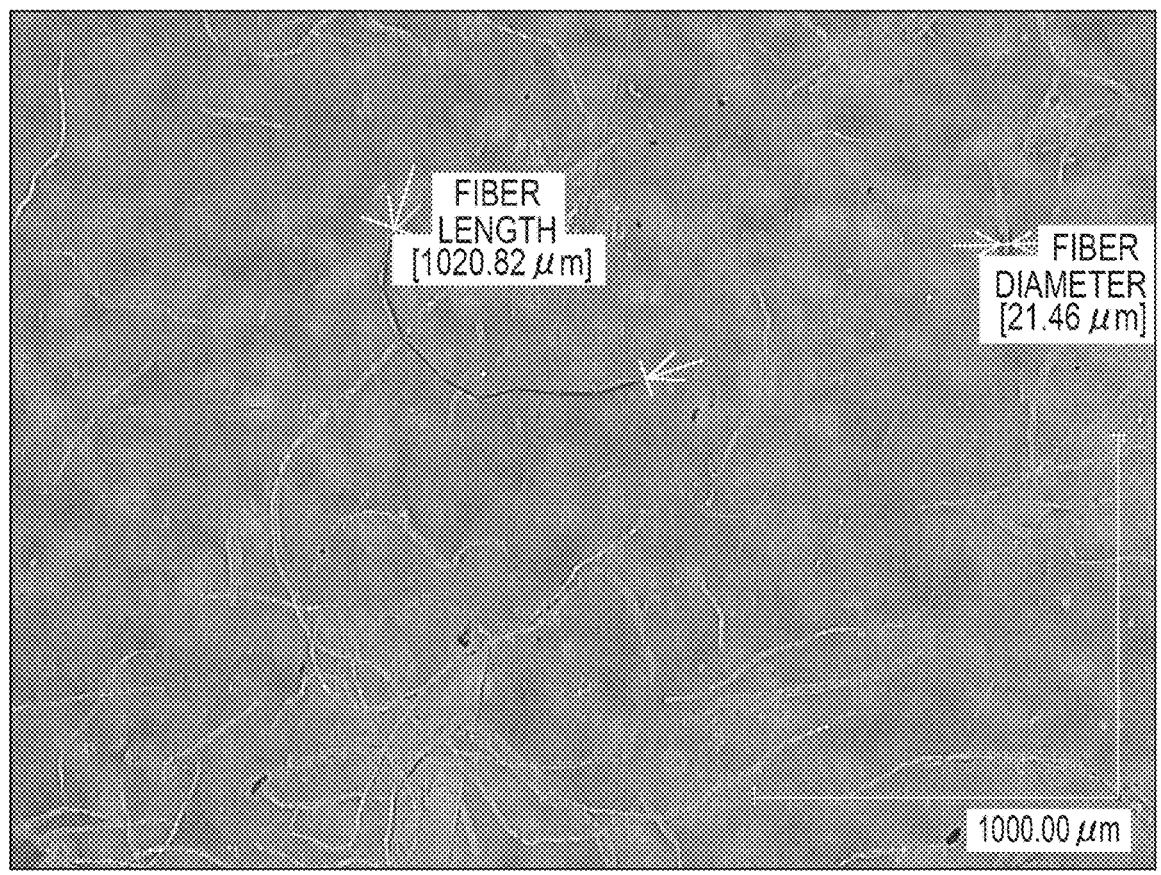
FIG. 3 is a reference micrograph showing fibers obtained by the recovery device according to any one of the first to third embodiments of the present invention.

FIG. 3 is a reference micrograph showing fibers recovered by the recovery device 2. This micrograph has revealed that the diameters of fibers recovered by the recovery device 2 are as uniform as those of toilet paper and fall within a range of 1 µm to 50 µm.

From the above, it can be seen that the distribution of properties of fiber components recovered by the recovery device 2 is extremely similar to that of properties of fibers of toilet paper, and that fiber components recovered by the recovery device 2 have properties equivalent to those of fiber components of toilet paper and are preferable as a dewatering aid.

It should be noted that when toilet paper is immersed in water, toilet paper does not dissolve, and fibers configured in the form of a sheet are merely untangled and dispersed. Accordingly, a large amount of fibers originating from toilet paper seem to exist in sewage sludge.

Figure 4:
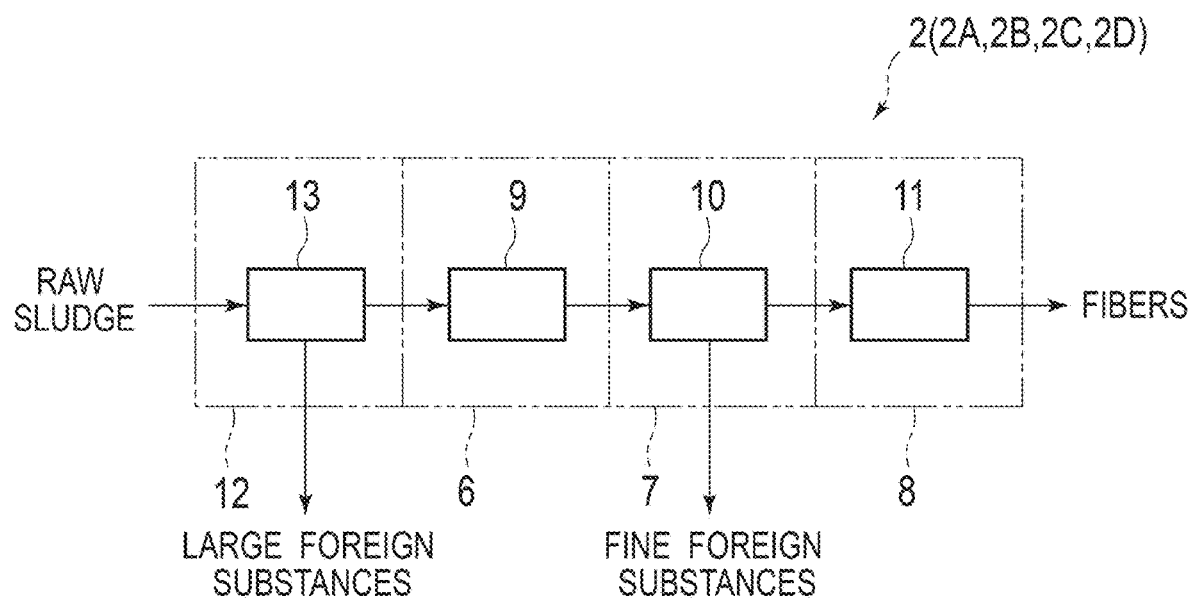
FIG. 4 is a diagram showing the recovery device and the flow of a recovery method according to the first embodiment of the present invention.

FIG. 4 is a diagram showing the recovery device 2 and the flow of the sludge dehydration method according to the first embodiment. The recovery device 2 according to the first embodiment includes a grinder 9, a separator 10, and an extractor 11. The sludge dehydration method according to the first embodiment includes a preparation step 6 for continuously untangling fiber components and granular solids and at the same time grinding and fragmenting granular solids by the grinder 9, a separation step 7 for separating solids other than fiber components by the separator 10, and an extraction step 8 for extracting fiber components used as a dewatering aid by the extractor 11.

Preparation Step 6

Solids in sewage flowing into the sewage treatment plant include foreign substances primarily composed of easily decomposable organic matter originating from food residues and SS (Suspended Solids) as well as plant-derived fiber components being hardly decomposable organic matter, which are main components of toilet paper to be recovered as a dewatering aid. There are cases where they are entangled with fiber components. Accordingly, in the preparation step 6, sludge needs to be prepared by untangling fiber components, cutting fiber components to lengths within the range of recovery, crushing foreign substances and SS into fine pieces, and the like. In the preparation step 6, dilution water may be added so that fragmentation may be performed with the concentration of sludge being lowered.

In the preparation step 6, foreign substances and SS including recovery target fiber components may be fragmented by the grinder 9. Most of fiber components are entangled with each other or with foreign substances. Thus, it is difficult for the separator 10 to remove small foreign substances having sizes not more than a lower limit of the range of recovery without processing sludge. Accordingly, fiber components are fragmented by the grinder 9 so that fiber components and foreign substances can be easily separated. In the case where principal foreign substances are food residues, grinding allows fiber components in food residues to be extracted and allows other organic matter to be fragmented.

The grinder 9 may be of any type such as a wheel type, a roller type, a pestle, or the like as long as fiber components can be continuously ground and fragmented. It should be noted, however, that the grinder 9 may be an apparatus which can grind only solids being the easily decomposable organic matter, because the separation of fiber components effective as a dewatering aid becomes difficult if both of hardly decomposable organic matter (fiber components) and easily decomposable organic matter are pulverized into powder.

Separation Step 7

In the separation step 7, fiber components prepared in the previous step are sifted using the separator 10 to separate predetermined fiber components from small foreign substances having sizes not more than the lower limit of the range of recover and the like. Fiber components have been prepared in the previous step, and foreign substances and the like entangled with fiber components have been untangled. Accordingly, by sifting out fiber components having sizes within the range of recovery, only fiber components having specific properties can be recovered. Sifting fragmented fiber components removes foreign substances and the like entangled with fiber components before fragmentation and, at the same time, also removes small fiber components having sizes under the range of recovery.

When separation is performed, separation assistance may be used. Separation assistance includes, for example, a process which injects washing water to separate foreign substances using water pressure, a process which untangles fiber components and foreign substances by immersion, a process which prevents fibers and foreign substances from being entangled with each other at the time of separation using multiple rolling elements, and the like.

Separation assistance which injects washing water makes it possible to further remove a slight amount of foreign substances and small fiber components having sizes under the range of recovery which are attached to fiber components. Moreover, separation assistance which immerses fragmented sludge at the time of separation makes it possible to pull apart and reliably separate a slight amount of foreign substances and small fiber components having sizes under the range of recovery which lie deeply between fibers. Further, separation assistance which mixes multiple rolling elements into fragmented sludge has the functions of preventing the entanglement of fibers in the separation step and untangling prepared sludge, and therefore improves separation efficiency.

It should be noted that by performing solid-liquid separation on discharged water containing foreign substances discharged from the separator 10 by clarifying filtration or the like, clarified water can be reused as washing water.

The separator 10 may be of any type such as a cylinder type, a belt type, or a vibrating sieve type as long as fiber components having specific properties can be separated from fragmented foreign substances.

Extraction Step 8

In the extraction step 8, fiber components having specific properties separated in the separation step 7 are continuously extracted and recovered. The extractor 11 is properly selected to be appropriate for the type of the separator 10. In the case where the separator 10 is of a cylinder type, the extractor 11 is, for example, of a type which has a screw conveyor inserted in the separator. Moreover, in the case where the separator 10 is of a belt type, the extractor 11 is, for example, a scraper pressed to a filtering surface. The extractor 11 may be of any type as long as discharging from the separator 10 can be continuously performed.

Recovered fiber components within a predetermined range are sent as a dewatering aid to the mixing tank 3 and mixed with difficult-to-dewater sludge as flocculation nuclei. It should be noted that most of solids such as foreign substances separated by the separation step 7 fall into the category of easily decomposable organic matter, and do not require a long period of biological treatment if sent to the biological treatment tank 1. This can contributes to the reduction of the volume of sludge.

Pretreatment Step

Moreover, in the case where large foreign substances having sizes not less than an upper limit of the range of recovery are mixed in sludge flowing into the sewage treatment plant, a pretreatment step 12 may be added in a stage before the preparation step 6. In the pretreatment step 12, large foreign substances in sewage flowing into the sewage treatment plant are removed by a pretreatment apparatus 13. Large foreign substances are inappropriate for a dewatering aid, and interfere with preparation in the preparation step 6 subsequent to this step. Thus, in the pretreatment step 12, large foreign substances having sizes not less than an upper limit of the range of recovery are separated from SS and small foreign substances including recovery target fiber components to remove large foreign substances. Accordingly, the pretreatment apparatus 13 may be of any type as long as foreign substances having sizes not less than the upper limit of the range of recovery can be removed, and may be a bar screen, a sieve, a drum screen, or the like.

The above-described preparation step 6, separation step 7, and extraction step 8 may be unified to be performed in one apparatus, and the pretreatment step 12 may be performed in the apparatus.

Figure 5:
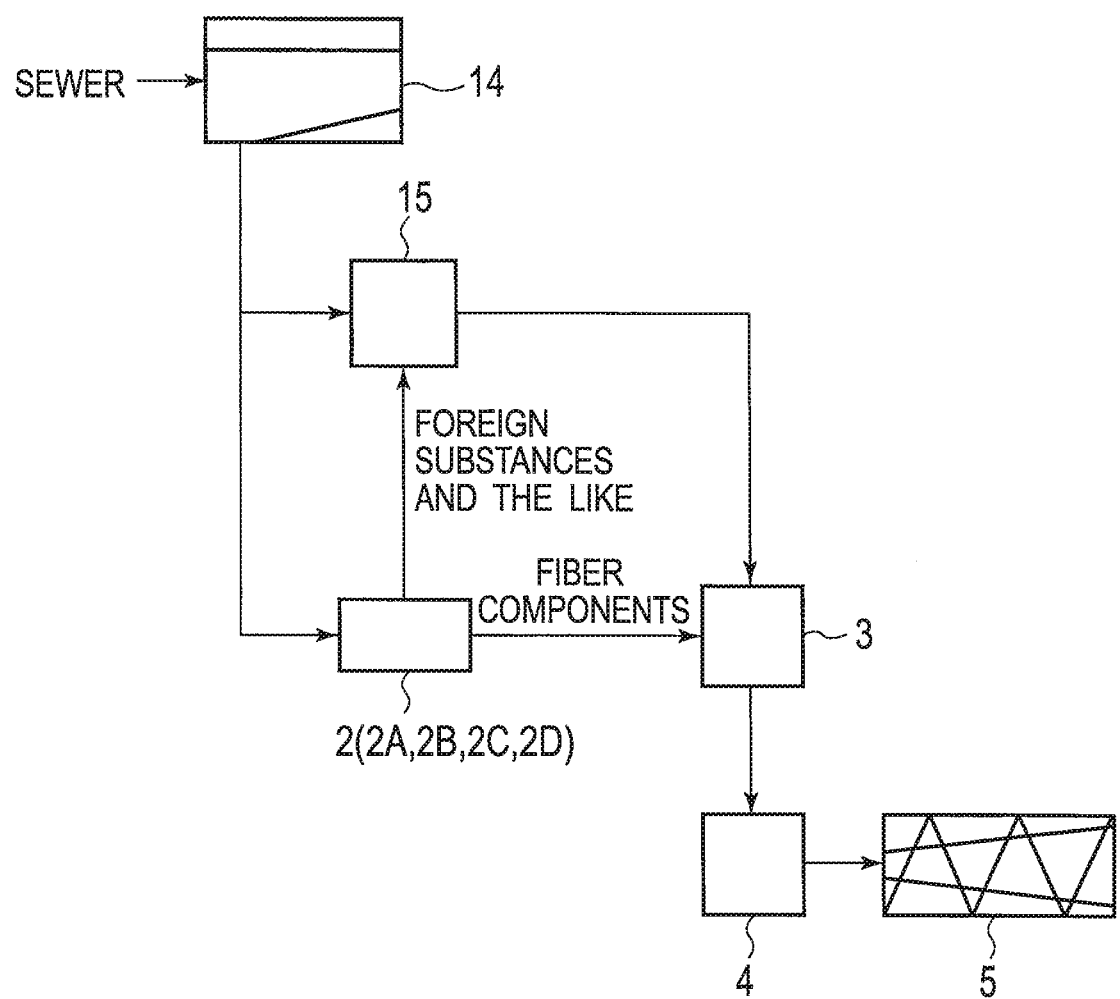
FIG. 5 is a diagram showing the sludge dehydration system and the flow of the sludge dehydration method according to the first embodiment of the present invention.

FIG. 5 is a diagram showing the flow of the sludge dehydration method in the treatment of digested sludge in the sewage treatment plant. Sewage flowing into the sewage treatment plant flows into a primary sedimentation tank 14. In the primary sedimentation tank 14, sewage gently flows, and organic matter containing fiber components and the like are sedimented. With regard to main components of sediments, fiber components are mainly toilet paper, and solids are mainly food residues. Fiber components of toilet paper have fiber lengths of 0.1 to 30 mm and fiber diameters of 1 to 50 μm. Sediments are took out as raw sludge from the bottom and collected.

The raw sludge taken out of the primary sedimentation tank 14 is biologically treated in the digester tank 15 to reduce the volume thereof. Part of the raw sludge taken out of the primary sedimentation tank 14 is transported to the recovery device 2, and fiber components having specific properties are selectively recovered. Foreign substances other than fiber components separated by the recovery device 2 are returned to the, digester tank 15. This contributes to digestion efficiency in the digester tank.

Digested sludge which is difficult-to-dewater sludge subjected to volume reduction in the digester tank 15 is formed into firm flocs with the addition of fiber components (dewatering aid) having specific properties and a flocculant in the mixing tank 3 and the flocculation and mixing tank 4, and then subjected to solid-liquid separation by the dewaterer 5 to become a dewatered cake with a low water content.

Figure 6:
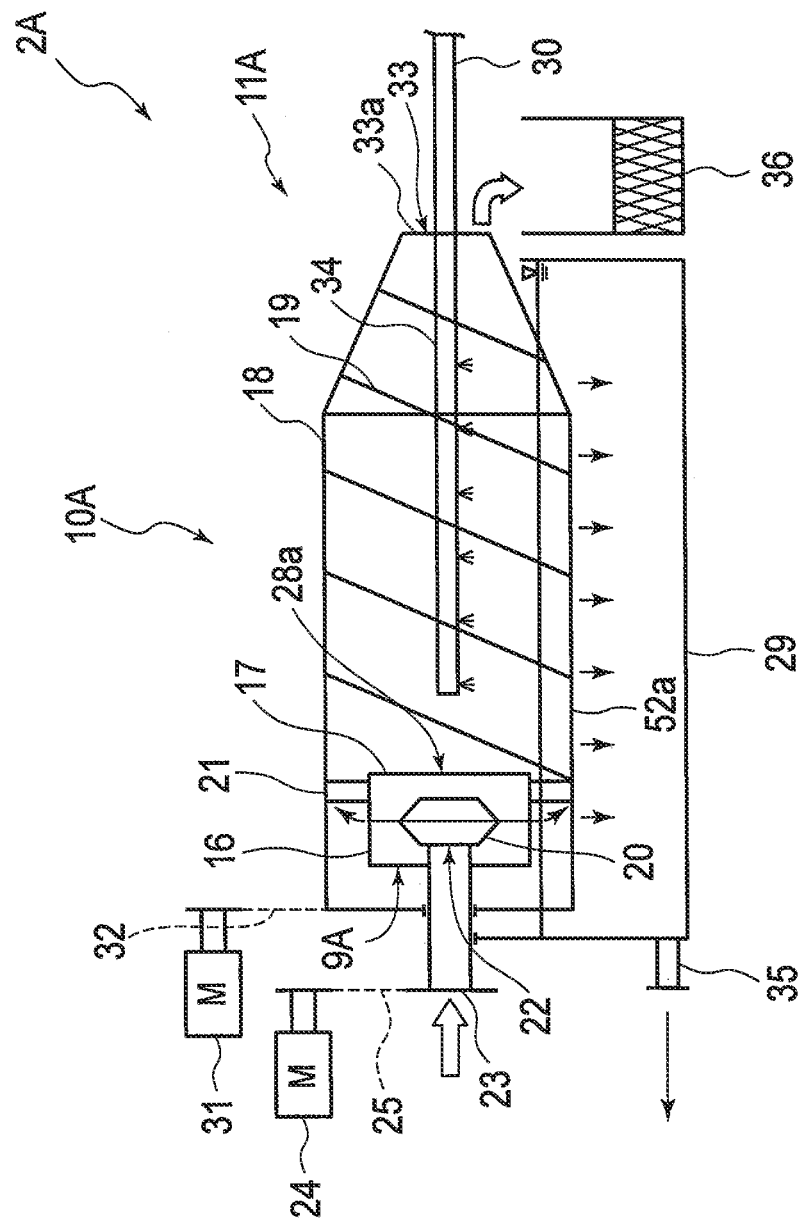
FIG. 6 is a detailed diagram of the recovery device according to the first embodiment of the present invention.

FIG. 6 is a detailed diagram of a recovery device 2A according to the first embodiment. The recovery device 2A mainly includes the preparation step 6, the separation step 7, and the extraction step 8. A grinder 9A for performing the preparation step 6 which fragments raw sludge includes a rotary disk 16 and a stationary disk 17 facing each other, and is provided in an end portion of a separator 10A for performing the separation step 7 which includes a rotary cylinder type screen 18. While prepared sludge discharged from the grinder 9A is being transported to an other end of the separator 10A by a screw impeller 19 erected on an inner surface of the screen 8, fragmented foreign substances and the like are separated and discharged through openings of the screen 18. Fiber components having specific properties are transported by the screw impeller 19 to the other end of the screen 18 and recovered.

In raw sludge sent from the primary sedimentation tank 14, fiber components and foreign substances are entangled with each other. Accordingly, in the preparation step 6, fiber components entangled with each other are prepared into fiber components having fiber lengths of 0.1 mm to 0.5 mm and fiber diameters of 1 μm to 50 μm. Raw sludge is diluted with dilution water and broken down into fine pieces by the grinder 9A. Raw sludge supplied between the rotary disk 16 and the stationary disk 17 is discharged to the outside while being broken down into fine pieces by coarse and fine irregularities on surfaces of the rotary disk 16 and the stationary disk 17, and fragmented raw sludge is sent to the separation step 7.

A specific configuration will be described in detail. The grinder 9A includes the rotary disk 16 and the stationary disk 17 in round shapes having conically recessed portions 20 formed therein from outer circumferential portions toward centers and facing each other. The outer circumferential portion of the stationary disk 17 is fixed to other member. In the present embodiment, the stationary disk 17 is fixed to the separator 10A with a radial rib 21. The rotary disk 16 has in a central portion thereof a supply port 22 communicating with the recessed portion 20 and can rotate with respect to the stationary disk 17. In the rotary disk 16, raw sludge is supplied from a supply tube 23 connected to the supply port 22 to the inside of the recessed portion 20. Power from a driving machine 24 is transmitted to the supply tube 23 through power transmission means 25 such as a belt to rotate the supply tube 23 and the rotary disk 16. The supply tube 23 and the rotary disk 16 are supported with bearings or the like at appropriate positions as required.

The volume of the recessed portions 20 of the rotary disk 16 and the stationary disk 17 facing each other is wide in a central portion and decreases toward the outer circumferences. A gap between outer circumferential edges of the rotary disk 16 and the stationary disk 17 is set to 1 mm or less. Raw sludge supplied to the central portion is fragmented by inner surfaces of the rotary disk 16 and the stationary disk 17 while being transferred toward the outer circumference by the injection pressure of supply means (not shown) and the centrifugal action of the rotary disk 16. Fibers having lengths of 0.1 mm to 30 mm are prepared to lengths of 0.1 mm to 5 mm by fragmentation.

In the present embodiment, dilution water is supplied to raw sludge to increase functions and effects of the preparation step 6. Specifically, fiber components entangled with foreign substances in raw sludge are untangled by grinding action in dilution water to become easy to separate. Large foreign substances are crushed to easy-to-remove sizes by fragmentation.

Since the grinder 9A is integrally provided in the separator 10A, prepared sludge discharged to the outside of the rotary disk 16 and the stationary disk 17 can be continuously separated by the separator 10A including the rotary cylinder type screen 18.

Figure 7:
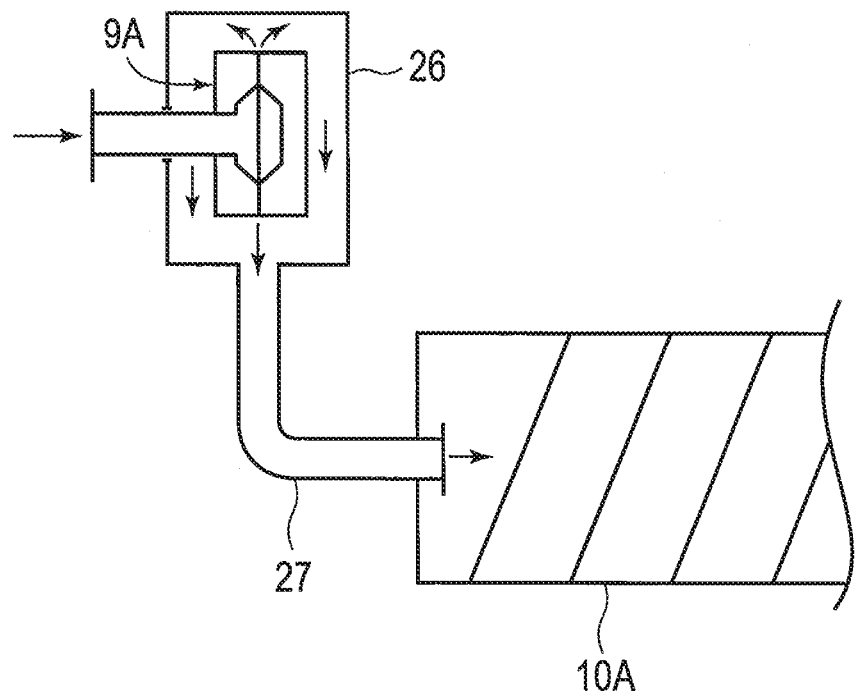
FIG. 7 is a diagram for explaining the recovery device according to the first embodiment of the present invention.

It should be noted that high-throughput cases can be properly dealt with by publicly known techniques such as increasing the diameters of the rotary disk 16 and the stationary disk 17, providing multiple stages of rotary disks 16 and stationary disks 17, and the like. Moreover, in the case where the grinder 9A is arranged outside the separator 10A as in FIG. 7, the preparation and separation steps can be continuously performed by surrounding the rotary disk 16 and the stationary disk 17 with a casing 26 and sending prepared sludge to the separator 10A through a transfer tube 27.

The separator 10A of the first embodiment includes the rotary cylinder type screen 18. While prepared sludge supplied to a supply portion 28a at an end portion of the screen 18 is being transported toward an other end thereof by the screw impeller 19 erected on an inner surface of the screen 18 toward the center, fragmented foreign substances and the like are separated and discharged through a large number of small holes provided in the screen 18 constituting a filtering surface 52a. A separation tank 29 for accumulating easily decomposable organic matter such as foreign substances and the like passed through openings of the screen 18 is provided below the filtering surface 52a of the rotary cylinder type screen 18.

A rotationally supported shaft 30 is provided to extend between two ends of the screen 18. In the case where the grinder 9A is provided in the screen 18, the screen 18 is rotationally supported through the supply tube 23 of the grinder 9A. Power from the driving machine 31 is transmitted to the screen 18 through power transmission means 32 such as a belt to rotate the screen 18.

In the first embodiment, a wall plate of the separation tank 29 is set to such a height that the wall plate overlaps the screen 18, and immersion water is stored in the separation tank 29. Thus, part of the screen 18 is immersed. Moreover, the screen 18 has at an end portion thereof an extraction portion 33a for recovering fiber components having specific properties. A portion of the screen 18 which is near the extraction portion 33a has a conical shape, and has a diameter gradually decreasing toward the extraction portion 33a. This can improve the action by which a slight amount of foreign substances lying deeply between fibers and small fiber components having sizes under the range of recovery is untangled and dispersed in the immersion water to be received by the separation tank together with water by gravitational separation. It should be noted that providing an injection device 34 for injecting high-pressure water into prepared sludge during separation is expected to have an equivalent effect.

A return pipe 35 is connected to the separation tank 29. Foreign substances primarily composed of easily decomposable organic matter separated and discharged into the separation tank 29 are returned to the biological treatment tank 1 through the return pipe 35. Fiber components primarily composed of plant fibers being the hardly decomposable organic matter are extracted in a stage before the biological treatment tank 1, and the percentage of easily decomposable organic matter originating from food residues is high in the biological treatment tank 1. Accordingly, biological treatment requires only a short reaction time, and the processing efficiency of the entire sewage treatment plant is improved.

Fiber components which have specific properties and which are not separated through the openings of the screen 18 to remain in the screen 18 are transported to the other end of the screen 18 by the screw impeller 19.

The extractor 11A of the first embodiment includes the screw impeller 19 for transporting fiber components in the screen 18 so as to be appropriate for the rotary cylinder type screen 18. The screw impeller 19 is erected by being helically wound on the inner surface of the screen 18. As the screen 18 rotates, the screw impeller 19 transports remaining fiber components to the extraction portion 33a, and the remaining fiber components are stored from the extraction portion 33a into the recovery tank 36. It should be noted that the screen 18 of a cylinder type having a screw shaft inserted therein, the screw shaft being formed by winding a screw impeller around a shaft, may be used as an extractor.

Recovered fiber components do not contain easily decomposable organic matter originating from food residues which decay in a short time, and can therefore be preserved for a long period of time without special treatments and apparatuses.

Figure 8:
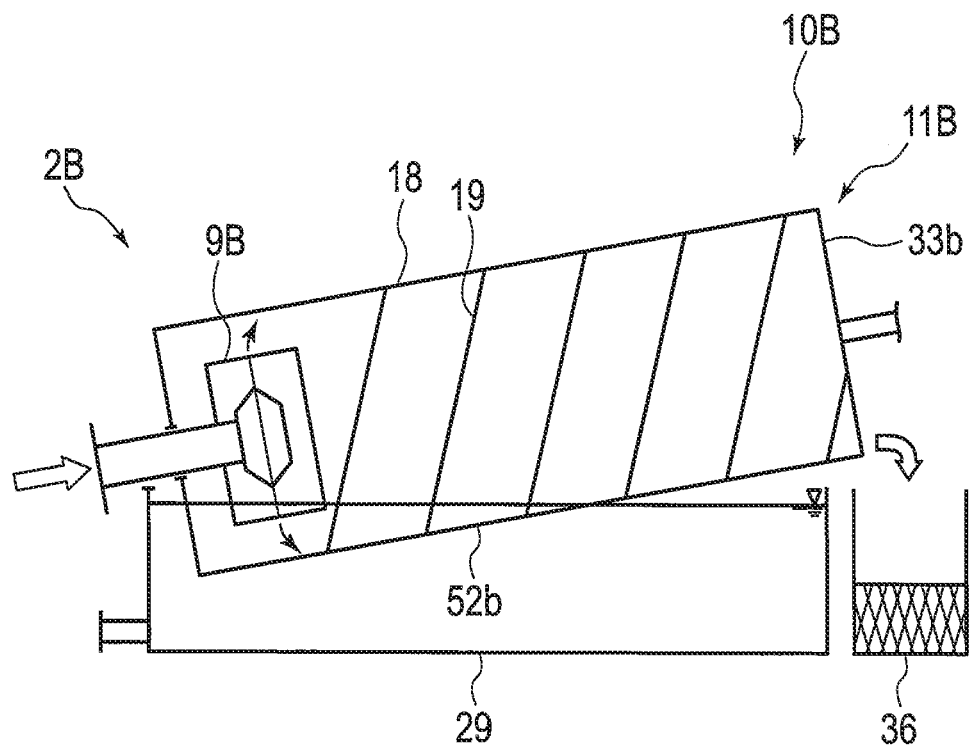
FIG. 8 is a detailed diagram of a recovery device according to modified example 1 of the first embodiment of the present invention.

FIG. 8 is a detailed diagram of a recovery device 2B according to modified example 1 of the first embodiment. The recovery device 2B is provided with an extraction portion 33b of an extractor 11B being inclined upward. A grinder 9B side of a filtering surface 52b of the screen 18 is immersed in the immersion water stored in the separation tank 29, and an extraction portion 33b side is not immersed in the immersion water. Prepared sludge discharged from the grinder 9B of the recovery device 2B is untangled and dispersed in the immersion water, and fiber components having specific properties are transported to the extraction portion 33b by the screw impeller 19 while small foreign substances are being separated and discharged through the screen 18 of a separator 10B, and are accumulated in the recovery tank 36.

Since the separator 10B is inclined, a region of the screen 18 near the extraction portion 33b is not immersed in the immersion water stored in the separation tank 29. By virtue of a washing and dispersing effect by immersion and a gravitational separation effect in the region near the extraction portion 33b, effects similar to those of the recovery device 2 of FIG. 5 can be obtained. Other components are the same as those of the embodiment shown in FIG. 6.

Figure 9:
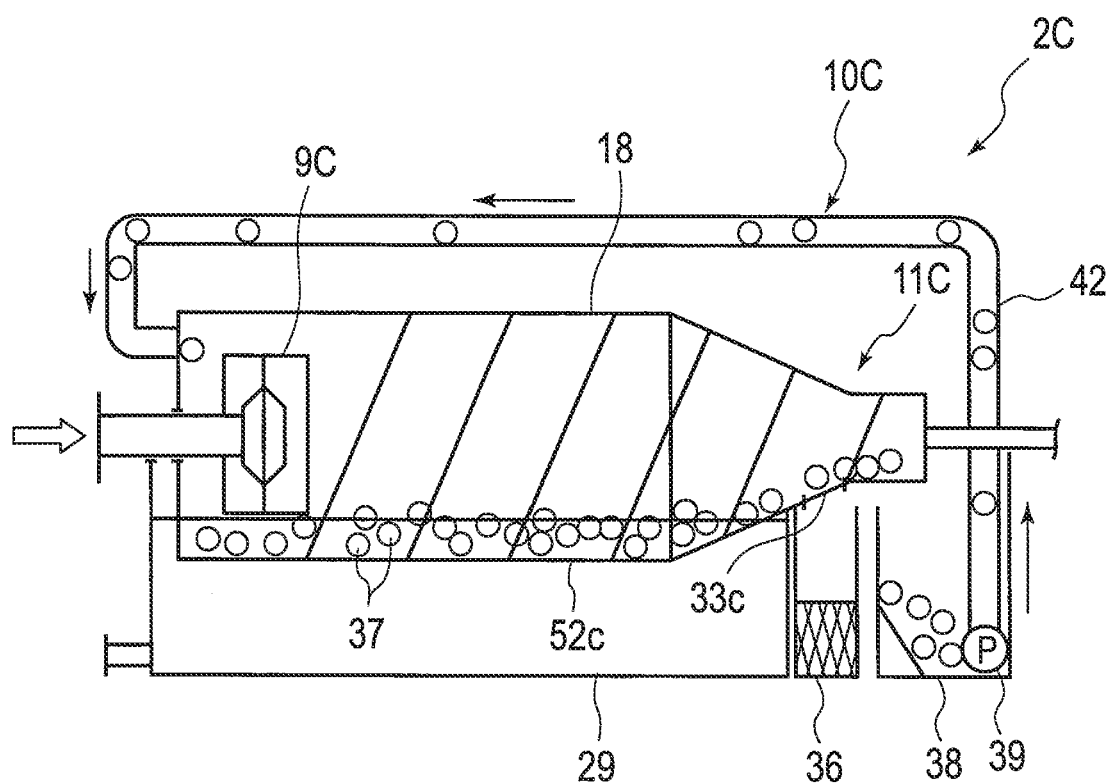
FIG. 9 is a detailed diagram of a recovery device according to modified example 2 of the first embodiment of the present invention.

FIG. 9 is a detailed diagram of a recovery device 2C according to a modified example 2 of the first embodiment. The recovery device 2C includes multiple rolling elements 37 mixed into the rotary cylinder type screen 18 to roll while being transported. In the recovery device 2C, prepared sludge discharged from the grinder 9C is mixed in the screen 18. Accordingly, the functions of preventing the entanglement of fibers in the separation step 7 and untangling prepared sludge are provided, and therefore separation efficiency is improved.

The material of the rolling elements 37 is not limited as long as the material is heavy material such as metal, synthetic rubber, or resin, but is preferably low-bounce rubber excellent in impact and vibration absorbability from the viewpoints of vibration and noise because the rolling elements 37 rolls while being transported in the screen 18.

In a separator 10C, an extraction portion 33c of an extractor 11C for recovering fiber components having specific properties is provided on a cylindrical surface of the screen 18. Setting the sizes of openings of the extraction portion 33c larger than fiber components and smaller than the diameters of rolling elements 37 allows only fiber components to be extracted. The rolling elements 37 are transported beyond the extraction portion 33c to be discharged from an end portion of the screen 18 into a rolling element tank 38. The rolling elements 37 stored in the rolling element tank 38 are supplied to an end portion of the screen 18 on the grinder 9C side through a circulation pipe 42 by publicly known return means (return unit) 39. The rolling elements 37 may be washed as required. Other components are the same as those of the embodiment shown in FIG. 6. For example, part of a filtering surface 52c of the screen 18 is immersed in the immersion water stored in the separation tank 29.

Figure 10:
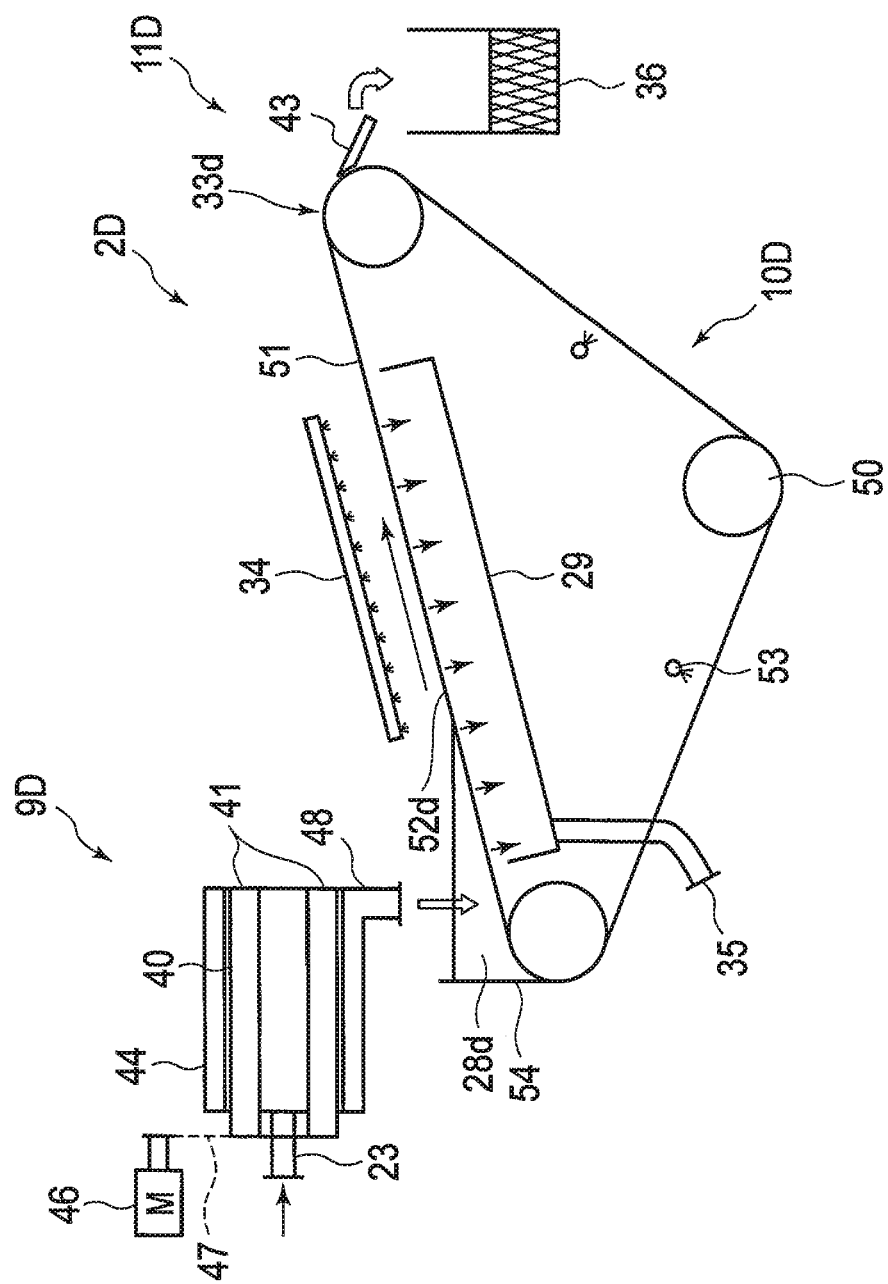
FIG. 10 is a detailed diagram of a recovery device according to modified example 3 of the first embodiment of the present invention.

FIG. 10 is a detailed diagram of a recovery device 2D according to modified example 3 of the first embodiment. The recovery device 2D includes a grinder 9D including a sliding member 41 configured to rotate in sliding contact with an inner wall of a cylindrical screen 40, and a separator 10D of a belt type. The grinder 9D fragments sludge into prepared sludge which is supplied to the separator 10D. While the prepared sludge is being transported toward the extraction portion 33d, foreign substances are separated. In the extraction portion 33d, predetermined fiber components are extracted with a scraper 43.

The grinder 9D includes a cylindrical casing 44 having one end closed, the cylindrical screen 40 located in the casing 44 to be radially separated from the casing 44 by a predetermined distance, and the sliding member 41 configured to be in sliding contact with the inner wall of the cylindrical screen 40. The sliding member 41 is rotated in sliding contact with the inner wall of the cylindrical screen 40 while being pressed against the inner wall of the cylindrical screen 40. In the present modified example, rollers are used as the sliding members 41 and rotated. The supply tube 23 is connected to a center of an opening portion of the cylindrical screen 40, and sludge is supplied to the inside of the cylindrical screen 40 through the supply tube 23. Power from the driving machine 46 is transmitted to the sliding members 41 through power transmission means 47 such as a belt to rotate the sliding members 41.

Sludge supplied from the supply tube 23 to the inside of the cylindrical screen 40 is fragmented while being ground by the pressing action of the sliding members 41 and centrifugal action, and is passed through small holes of the cylindrical screen 40. Prepared sludge transferred between the cylindrical screen 40 and the casing 44 is supplied to the separator 10D through the transfer tube 48 connected to the casing 44. It should be noted that in the present modified example, the sliding members 41 are in sliding contact with the inner wall of the cylindrical screen 40, but are not limited to these as long as the sliding members 41 have similar effects.

With regard to the configuration of the separator 10D, an endless belt 51 having a large number of small holes is passed over multiple rolls 50, and prepared sludge is supplied to a filtering surface 52d in an upper portion. By driving the rolls 50, the endless belt 51 is caused to run while separating small foreign substances. The separation tank 29 is provided below the filtering surface 52d. The separation tank 29 stores filtered small foreign substances. The return pipe 35 is connected to the separation tank 29. Foreign substances primarily composed of easily decomposable organic matter which are separated and discharged into the separation tank 29 are returned to the biological treatment tank 1 through the return pipe 35. A washing apparatus 53 for regenerating the filtering surface 52d is provided at an appropriate position if necessary. Washing water may be filtrate obtained by separating foreign substances from the separation tank 29 by clarifying filtration or the like. An overflow prevention cover 54 may be provided in a prepared sludge supply portion 28d, and prepared sludge and part of the filtering surface 52d may be immersed in the immersion water stored in the separation tank 29.

The extractor 11D includes the scraper 43 pressed against the extraction portion 33d of the endless belt 51. The scraper 43 scrapes off predetermined fiber components remaining on an upper surface of the endless belt 51. The scraped fiber components are stored in the recovery tank 36.

The grinder 9, the separator 10, and the extractor 11 of the recovery device 2 can be used in various combinations and can be properly selected according to specifications and the treatment plant.

Figure 11:
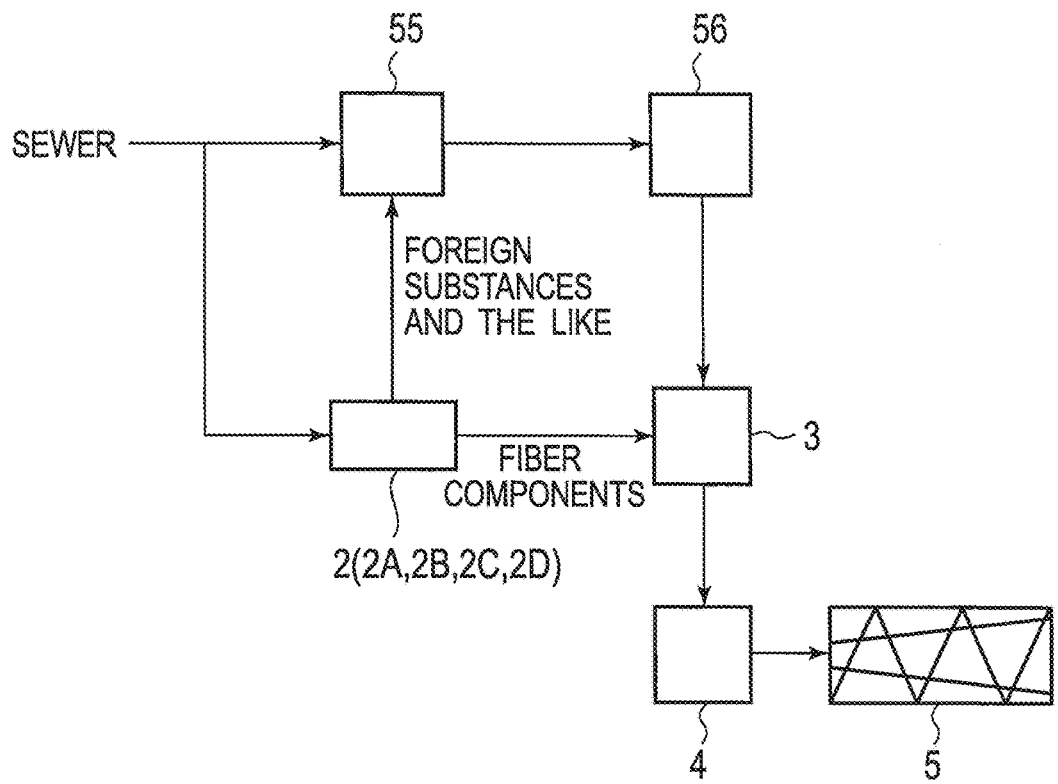
FIG. 11 is a diagram showing a sludge dehydration system and the flow of a sludge dehydration method according to a first embodiment of the present invention for the case where an OD process is employed.

FIG. 11 is a diagram showing a sludge dehydration system and the flow of a sludge dehydration method for the case where an OD process is employed in the sewage treatment plant. Sewage coming from sewers is sent to a reaction tank 55 for performing the OD process and the recovery device 2 through passages. Fiber components are recovered from sludge sent to the recovery device 2, and discharged foreign substances, moisture, and the like are sent to the reaction tank 55. The foreign substances and the like sent from the recovery device 2 to the reaction tank 55 are obtained by recovering fiber components being the hardly decomposable organic matter from sewage, and therefore contain a large amount of easily decomposable organic matter. Accordingly, sending easily decomposable organic matter from the recovery device 2 to the reaction tank 55 reduces a reaction period for biological treatment. In the reaction tank 55, an activated sludge process is performed, activated sludge is sent to a final sedimentation tank 56. In the final sedimentation tank 56, sludge is sedimented, and supernatant liquid is sent to an unillustrated disinfection tank and released after disinfection. The sedimented sludge is sent to the mixing tank 3 to be mixed with fiber components recovered by the recovery device 2. The sludge having fiber components added thereto in the mixing tank 3 is sent to the flocculation and mixing tank 4, and a flocculant is added thereto to produce flocculated sludge. The flocculated sludge is sent to the dewaterer 5 to be dewatered.

Figure 12:
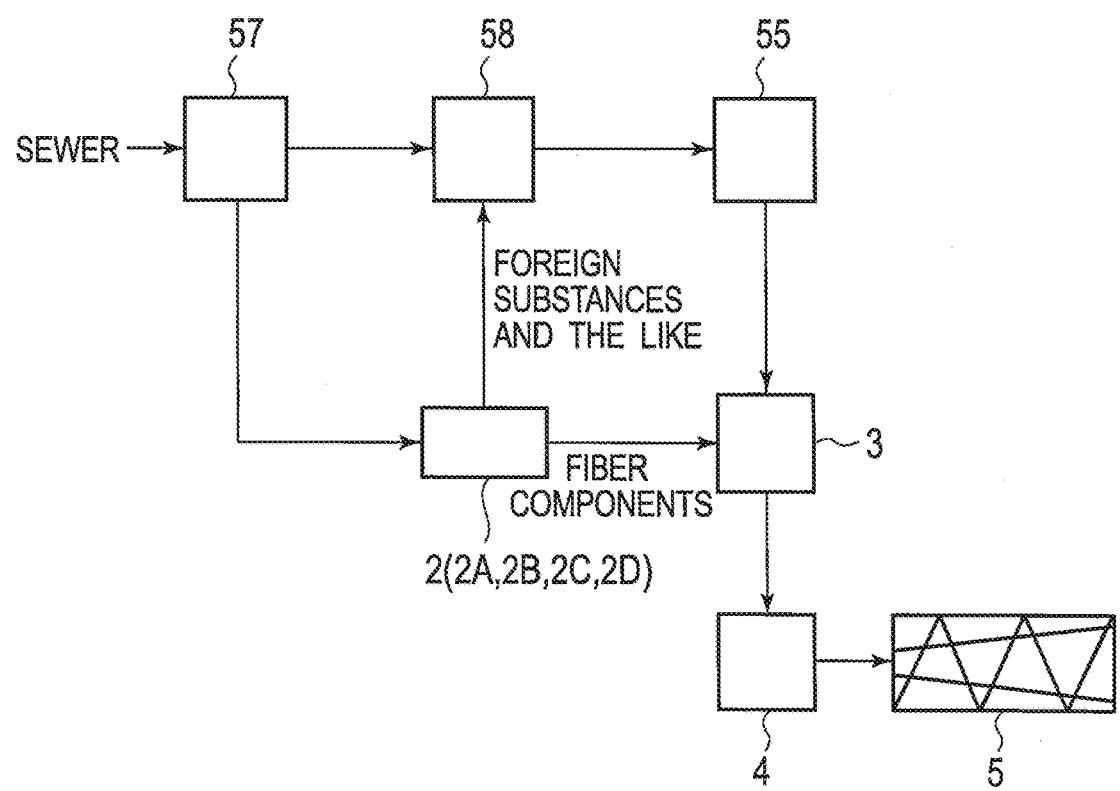
FIG. 12 is a diagram showing the sludge dehydration system and the flow of the sludge dehydration method according to the first embodiment of the present invention in which an MBR process is employed.

FIG. 12 is a diagram showing a sludge dehydration system and the flow of a sludge dehydration method for the case where an MBR (membrane bioreactor process) is employed in the sewage treatment plant. Sewage coming from sewers is separated into solids and other sewage with a fine-mesh inflow screen 57 provided in a passage. The solids separated by the inflow screen 57 are sent to the recovery device 2, and the other sewage is sent to a preparation tank 58. Recovered material separated by the inflow screen 57 contains foreign substances and the like as well as fiber components because the separation has been performed using the fine-mesh inflow screen 57.

Fiber components having sizes within the range of recovery are recovered from the solids sent to the recovery device 2, and other foreign substances, moisture, and the like are sent to the preparation tank 58. Sewage sent to the preparation tank 58 is sent to the reaction tank 55 for performing a membrane bioreactor process. In the recovery device 2, since fiber components of hardly decomposable organic matter are recovered from sewage, foreign substances and the like sent from the recovery device 2 to the preparation tank 58 contain a large amount of easily decomposable organic matter. Accordingly, sending easily decomposable organic matter from the preparation tank 58 to the reaction tank 55 reduces a reaction period for biological treatment. Filtrate passed through a biofilm of the reaction tank 55 is sent to an unillustrated disinfection tank and released after disinfection. Sludge taken out of the reaction tank 55 is sent to the mixing tank 3 to be mixed with fiber components recovered by the recovery device 2. The sludge having fiber components added thereto in the mixing tank 3 is sent to the flocculation and mixing tank 4, and a flocculant is added thereto to produce flocculated sludge. The flocculated sludge is sent to the dewaterer 5 to be dewatered.

Figure 13:
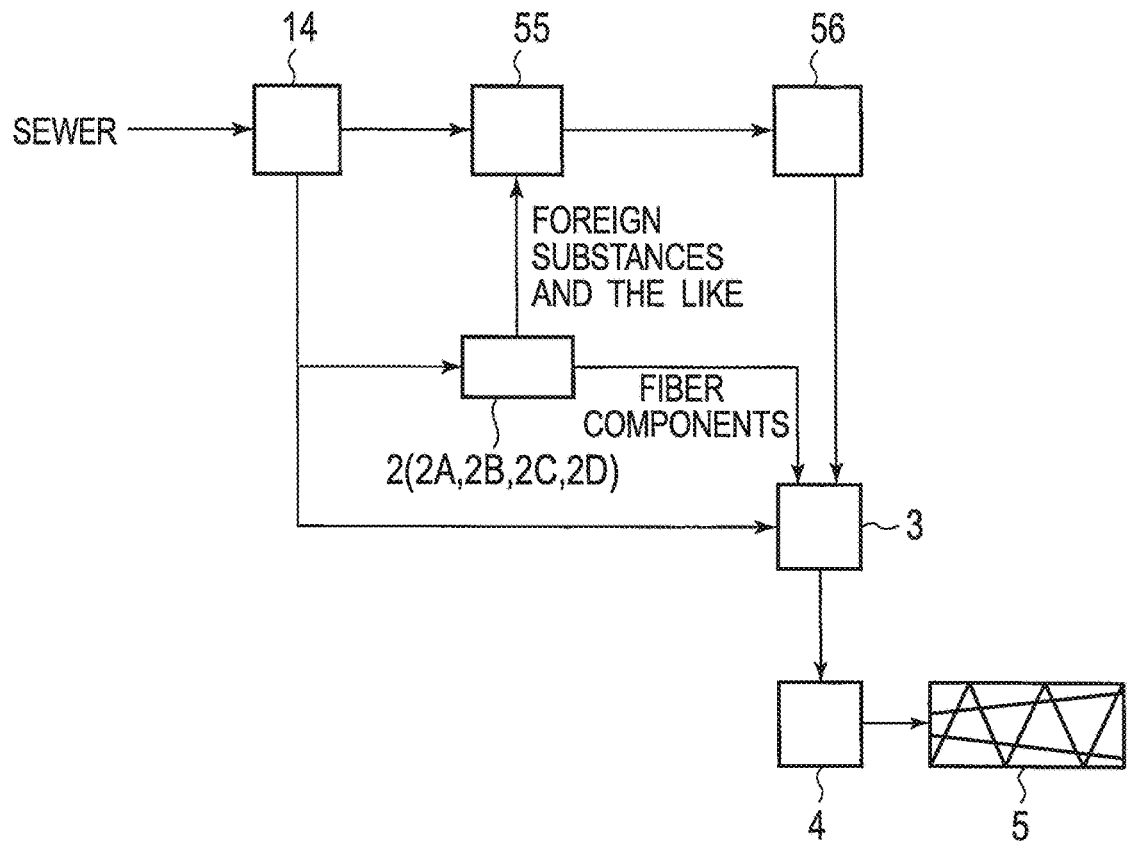
FIG. 13 is a diagram showing the sludge dehydration system and the flow of the sludge dehydration method according to the first embodiment of the present invention which are employed in mixed raw sludge treatment.

FIG. 13 is a diagram showing a sludge dehydration system and the flow of a sludge dehydration method for the case where mixed raw sludge is treated in the sewage treatment plant. At nighttime, the amount of produced sewage is generally smaller than that of daytime, and therefore the amount of sewage taken out of the primary sedimentation tank 14 decreases. Accordingly, in the mixed raw sludge, the percentage of excess sludge sent from the final sedimentation tank 56 increases, and therefore becomes difficult to dewater. Thus, using the sludge dehydration method of the above-described embodiment to dewater the mixed raw sludge improves dewatering efficiency.

Sewage coming from sewers is sent to the primary sedimentation tank 14. In the primary sedimentation tank 14, sewage gently flows, and sediments are taken out as raw sludge to be sent to the recovery device 2 and the mixing tank 3. Moreover, supernatant liquid in the primary sedimentation tank 14 is sent to the reaction tank 55. Fiber components are recovered by the recovery device 2. The recovered fiber components are sent to the mixing tank 3. Further, foreign substances and the like discharged by the recovery device 2 are sent to the reaction tank 55. In the recovery device 2, since fiber components of hardly decomposable organic matter are recovered from raw sludge, foreign substances and the like discharged from the recovery device 2 contain a large amount of easily decomposable organic matter. Accordingly, sending easily decomposable organic matter to the reaction tank 55 reduces a reaction period for biological treatment. Sludge decomposed in the reaction tank 55 is sent to the final sedimentation tank 56. In the final sedimentation tank 56, sludge is sedimented, and supernatant liquid is sent to an unillustrated disinfection tank and released after disinfection. The sedimented sludge is sent to the mixing tank 3, and mixed with raw sludge taken out of the primary sedimentation tank 14 to become mixed raw sludge. Moreover, fiber components recovered by the recovery device 2 are also sent to the mixing tank 3 to be added to the mixed raw sludge. The mixed raw sludge having fiber components added thereto is sent to the flocculation and mixing tank 4, and a flocculant is added thereto to produce flocculated sludge. The flocculated sludge is sent to the dewaterer 5 to be dewatered.

In the fiber recovery device 2, the fiber recovery method, the sludge dehydration system, and the sludge dehydration method according to the first embodiment, fiber components in sludge flowing into the sewage treatment plant are effectively used as a dewatering aid. Accordingly, a dewatering aid can be procured from waste in the treatment plant, and there is no need to purchase and stockpile a dewatering aid. This can reduce running cost and downsize the facility.

Moreover, in the fiber recovery device, the fiber recovery method, the sludge dehydration system, and the sludge dehydration method according to the first embodiment, difficult-to-dewater organic matter in sludge is effectively used as a dewatering aid in the sludge dewatering process in the treatment system, and easily decomposable organic matter is returned to the biological treatment tank. Thus, a dewatered cake with a low water content can be produced, and a reaction period can be shortened in the biological treatment step in the treatment plant. Accordingly, the fiber recovery device, the fiber recovery method, the sludge dehydration system, and the sludge dehydration method according to the first embodiment can contribute to the improvement of the processing efficiency of the entire treatment plant.

Next, a second embodiment of the present invention will be described.

In a sludge dehydration system and a sludge dehydration method according to the second embodiment, a dewaterer for dewatering supplied sludge is used. Fiber components recovered from sewage flowing into the sewage treatment plant are added to treatment target difficult-to-dewater sludge to improve dewaterability. Sewage which has just flown into the sewage treatment plant is rich in fiber components. Fiber components having properties such as predetermined lengths and diameters are recovered from the sewage to be added to difficult-to-dewater sludge. This contributes to the flocculation of difficult-to-dewater sludge, and improves the dewaterability of difficult-to-dewater sludge.

As described previously, difficult-to-dewater sludge means sludge which exhibits poor dewaterability due to a great reduction in the content of fiber components acting as flocculation nuclei caused by biological treatment or the like. For example, digested sludge produced in an anaerobic digester tank, OD excess sludge produced in a reaction tank for an OD process, and the like fall into the category of difficult-to-dewater sludge.

Figure 14:
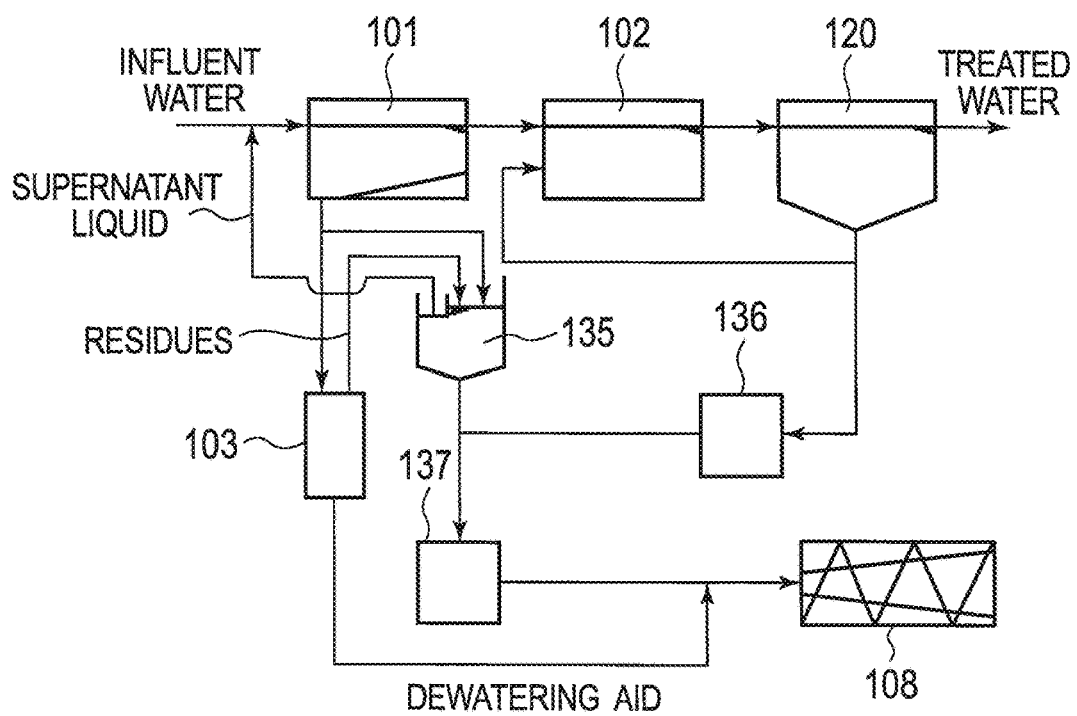
FIG. 14 is a diagram showing a sludge dehydration system and the flow of a sludge dehydration method according to a second embodiment of the present invention.

FIG. 14 is a diagram showing the sludge dehydration system and the flow of the sludge dehydration method according to the second embodiment. Sewage flowing into the sewage treatment plant is sent to a primary sedimentation tank 101, and raw sludge taken out is biologically treated in a digester tank 137 to be dewatered. Sediments in the primary sedimentation tank 101 contain fiber components, which are mainly toilet paper, solids such as food residues and excrements, as main components. Fiber components of toilet paper have fiber lengths of 0.1 to 30 mm and fiber diameters of 1 to 50 μm.

As shown in FIG. 14, the sludge dehydration system according to the second embodiment includes the primary sedimentation tank 101 for separating influent water flowing into the sewage treatment plant, a reaction tank 102 for clarifying organic matter in sewage separated in the primary sedimentation tank 101, a gravity thickener 135 for thickening raw sludge separated in the primary sedimentation tank 101, a recovery device 103 for taking out a predetermined amount of raw sludge in a stage before the gravity thickener 135 to selectively separate and recover a dewatering aid, a final sedimentation tank 120 for separating mixed liquid in the reaction tank 102, a mechanical thickener 136 for thickening excess sludge separated in the final sedimentation tank 120, a digester tank 137 for anaerobically treating gravitationally thickened sludge and mechanically thickened sludge, and a dewaterer 108 for performing solid-liquid separation on sludge in which the recovered fiber components and digested sludge are mixed. A tank for temporarily storing the recovered dewatering aid may be provided.

The gravity thickener 135 also thickens residues such as easily decomposable organic matter returned from the recovery device 103. The gravity thickener 135 returns supernatant liquid to a stage before the primary sedimentation tank 101. Part of sludge returned to the reaction tank 102 from the final sedimentation tank 120 is sent to the mechanical thickener 136.

In the sludge dehydration system and the sludge dehydration method according to the second embodiment, as in the first embodiment, fiber components in sewage flowing into the sewage treatment plant are recovered by the recovery device 103 so that fiber components in sewage may be utilized as a dewatering aid. The recovered fiber components are added to unflocculated difficult-to-dewater sludge and the like to function as flocculation nuclei.

Properties, such as materials, lengths, and diameters, of a dewatering aid affect the agglutination of sludge having the dewatering aid added thereto. Adding a dewatering aid having appropriate properties to sludge causes firm flocs to be formed and improves dewaterability. Accordingly, properties of a dewatering aid suitable for sludge to be treated are selected in advance. In the sludge dehydration system and the sludge dehydration method according to the second embodiment, as in the first embodiment, only fiber components having predetermined properties are recovered and used as a dewatering aid to improve dewaterability.

As described in the first embodiment, it has been found out that using toilet paper as a dewatering aid can greatly reduce the water content of a dewatered cake. Accordingly, focusing attention on properties of fibers of toilet paper led to success in reducing the water content by utilizing fiber components having properties equivalent to those of toilet paper as a dewatering aid.

FIG. 2 is a graph for comparing toilet paper and fibers recovered by the recovery device 103. In the graph, a comparison is made between fiber components obtained by dissolving toilet paper in water and fiber components recovered from the sewage treatment plant by the recovery device 103, with the horizontal axis representing fiber length, the vertical axis representing the number of fibers. A result of the comparison has revealed that the distribution (fiber length, the number of fibers) of fibers in sewage sludge is very similar to that of toilet paper. Moreover, with regard to properties of recovered fibers, it can be seen that fiber length is preferably 0.1 mm to 5 mm.

FIG. 3 is a reference micrograph showing fibers recovered by the recovery device 103. This micrograph has revealed that the diameters of fibers recovered by the recovery device 103 are as uniform as those of toilet paper and fall within a range of 1 μm to 50 μm.

From the above, it can be seen that the distribution of properties of fiber components recovered by the recovery device 103 is extremely similar to that of properties of fibers of toilet paper, and that fiber components recovered by the recovery device 103 have properties equivalent to those of fiber components of toilet paper and are preferable as a dewatering aid.

Figure 15:
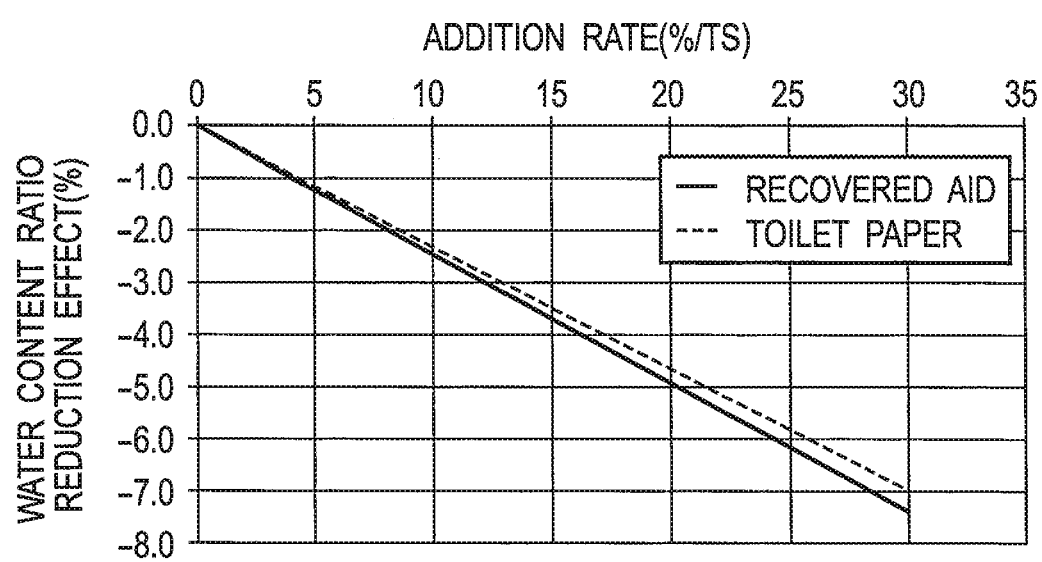
FIG. 15 is a graph for comparing the water content of a dewatered cake having toilet paper added thereto and the water content of a dewatered cake having recovered fibers added thereto according to any one of the first to third embodiments of the present invention.

FIG. 15 is a graph for comparing the water content of a dewatered cake having toilet paper added thereto and the water content of a dewatered cake having recovered fibers added thereto. In this graph, a comparison is made between effects of toilet paper and recovered fibers as dewatering aids, with the horizontal axis representing the addition rate of an additive, the vertical axis representing the effect of reducing the water content. In both cases, as the addition rate increases, the water content of the dewatered cake decreases, and the trends of the two are very similar to each other. Accordingly, it can be seen that fiber components recovered by the recovery device 103 have properties equivalent to those of fiber components of toilet paper and are favorable as a dewatering aid.

The recovery device 103 according to the second embodiment includes a grinder 130 and a washing and separating machine 131. The sludge dehydration method according to the second embodiment includes a preparation step 132 for preparing fiber components by the grinder 130, and a separation step 133 for washing out organic components and the like not targeted for recovery and recovering fibers targeted for recovery by the washing and separating machine 131.

Preparation Step 132

Solids in sewage flowing into the sewage treatment plant include foreign substances primarily composed of easily decomposable organic matter originating from food residues and SS as well as plant fibers being hardly decomposable organic matter, which are main components of toilet paper to be recovered as a dewatering aid. There are cases where they are entangled with fiber components. Accordingly, in the preparation step 132, sludge needs to be prepared by cutting fiber components to lengths within the range of recovery, untangling fiber components, reducing the sizes of foreign substances and SS, and the like. At this time, dilution water may be added to perform untangling. In the preparation step 132, dilution water may be added so that breaking down into fine pieces may be performed with the concentration of sludge being lowered.

In the preparation step 132, foreign substances and SS including recovery target fiber components may be broken down into fine pieces by the grinder 130. Most fiber components are entangled with each other or with organic matter or the like. Thus, it is difficult for the washing and separating machine 131 to remove the organic matters or the like without processing sludge. Accordingly, fiber components are broken down into fine pieces by the grinder 130 so that fiber components and the organic matter or the like can be easily separated. In the case where the organic matter or the like are principally food residues, grinding allows fiber components in food residues to be extracted and allows other organic matter or the like to be broken down into fine pieces.

The grinder 130 may be of any type such as a wheel type, a roller type, a mixer, or the like as long as fiber components can be broken down into fine pieces.

Separation Step 133

In the separation step 133, fiber components prepared in the previous step are sifted using the washing and separating machine 131 and washed out using washing water to separate predetermined fiber components from easily decomposable organic matter. Fiber components have been prepared in the previous step, and easily decomposable organic matter and the like entangled with fiber components have been untangled. Accordingly, by sifting out fiber components having sizes within the range of recovery, only fiber components having specific properties can be recovered.

A slight amount of organic matter and the like adhering to fiber components can be further removed by washing sifted fiber components with washing water to a certain extent. A rotary cylinder type separator or the like is used as the washing and separating machine 131. In the case where the washing and separating machine 131 is a rotary cylinder type separator, injecting washing water from an inside washing pipe 138 allows fiber components to be washed while being sifted, and makes it possible to reliably recover fiber components having sizes within the range of recovery. The rotary cylinder type separator may be any apparatus as long as fiber components are washed while being sifted, and there are various conceivable forms.

The recovered fiber components within the range of recovery are added as a dewatering aid to difficult-to-dewater sludge to function as flocculation nuclei. It should be noted that if solid-liquid separation is performed on washing wastewater of the washing and separating machine 131 by gravity thickening or the like, supernatant liquid can be further subjected to clarifying filtration to be reused as washing water. Since fiber components (hardly decomposable organic matter) have been recovered by the recovery device 103, solids contain a large amount of easily decomposable organic matter. Sending the solids to the digester tank 137 can improve decomposition efficiency.

Foreign Substance Removal Step

Moreover, in the case where large foreign substances and the like having sizes not less than an upper limit of the range of recovery are mixed in sewage flowing into the sewage treatment plant, the following foreign substance removal step is added in a stage before the preparation step 132. In the foreign substance removal step, foreign substances and the like in sewage flowing into the sewage treatment plant are removed with a screen or the like. This step separates large foreign substances and the like having sizes not less than an upper limit of the range of recovery from organic matter containing recovery target fiber components, small foreign substances, and the like, and removes large foreign substances and the like.

Large foreign substances and the like are inappropriate for a dewatering aid, interfere with preparation in the preparation step 132 subsequent to this step, and therefore must be removed in a first step. Accordingly, the screen may be of any type as long as foreign substances having sizes not less than the upper limit of the range of recovery and the like can be removed, and may be a bar screen, a sieve, a drum screen, or the like. Moreover, the above-described preparation step 132 and separation step 133 can also be performed in one apparatus, and foreign substance removal step may be included in the apparatus.

Figure 16:
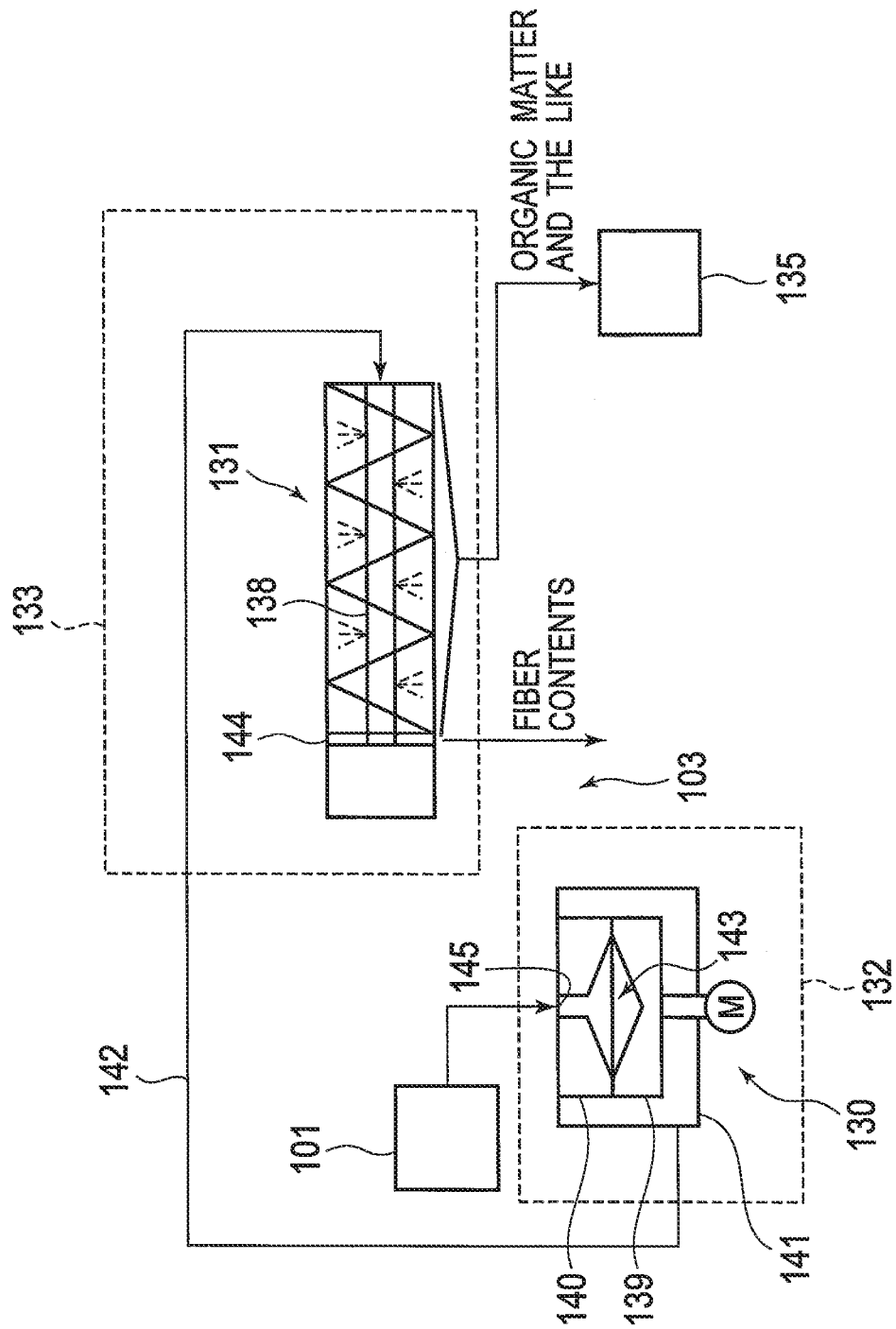
FIG. 16 is a detailed diagram showing a recovery device and the flow of a recovery method according to the second embodiment of the present invention.

FIG. 16 is a detailed diagram showing the recovery device 103 and the flow of the recovery method according to the second embodiment. As described above, the recovery device 103 includes the grinder 130 and the washing and separating machine 131. The sludge dehydration method according to the second embodiment mainly includes the preparation step 132 and the separation step 133.

Preparation Step 132

In the second embodiment, in raw sludge sent from the primary sedimentation tank 101, fiber components are entangled with foreign substances and organic matter. Accordingly, in the preparation step 132, fiber components entangled with each other are prepared into fiber components having fiber lengths of 0.1 mm to 0.5 mm and fiber diameters of 1 µm to 50 µm. Raw sludge is diluted with dilution water and broken down into fine pieces by the grinder 130 including a rotary disk 139 and a stationary disk 140 facing each other. Raw sludge is supplied between the rotary disk 139 and the stationary disk 140 facing each other, and discharged to the outside while being broken down into fine pieces by coarse and fine irregularities on surfaces of the rotary disk 139 and the stationary disk 140. Thus, raw sludge broken down into fine pieces is sent to the separation step 133.

The grinder 130 includes the rotary disk 139 and the stationary disk 140 in round shapes having conically recessed portions 143 formed therein from outer circumferential portions toward centers and facing each other. The rotary disk 139 is connected to a rotating shaft having an electric motor at other end thereof and provided to be rotatable with respect to the stationary disk 140. The stationary disk 140 has a supply port 145 in a central portion thereof so that raw sludge may be supplied from the supply port 145 to the inside of the recessed portion 143.

The volume of the recessed portions 143 of the rotary disk 139 and the stationary disk 140 facing each other is wide in a central portion and decreases toward the outer circumferences. A gap between outer circumferential edges of the rotary disk 139 and the stationary disk 140 is set to 1 mm or less. Raw sludge supplied to the central portion is broken down into fine pieces by inner surfaces of the rotary disk 139 and the stationary disk 140 while being transferred toward the outer circumference by the injection pressure of supply means (not shown) such as a pump and the centrifugal action of the rotary disk 139. Fibers having lengths of 0.1 mm to 30 mm are prepared to lengths of 0.1 mm to 5 mm by breaking down into fine pieces. Fiber components entangled with foreign substances and organic matter in raw sludge are untangled by dilution and breaking down into fine pieces to become easy to separate. Large foreign substances are crushed to easy-to-remove sizes by breaking down into fine pieces.

Raw sludge discharged to the outside of the rotary disk 139 and the stationary disk 140 is passed through a transfer tube 142 connected to a casing 141 surrounding the rotary disk 139 and the stationary disk 140, and is sent to the washing and separating machine 131 for performing the separation step 133.

Separation Step 133

The separation step 133 of the second embodiment is performed by the washing and separating machine 131. Prepared raw sludge sent from the transfer tube 142 to the washing and separating machine 131 contains fiber components within and outside the range of recovery, moisture, foreign substances, and the like. Moreover, in the case where fiber components cannot be separated from moisture or foreign substances because of a heavy water load if prepared raw sludge is inputted directly to the washing and separating machine 131, moisture or foreign substances may be removed to a certain extent by a thickening apparatus in advance to reduce a water load.

The washing and separating machine 131 includes a cylindrical screen. The washing and separating machine 131 removes organic matter outside the range of recovery, foreign substances, and the like with the screen while transporting fiber components. Fine holes of the screen are set so that fiber components having sizes within the range of recovery may be caused to remain. The washing and separating machine 131 washes fiber components by causing washing water to be injected from the washing pipe 138 while transporting recovery target fiber components. Foreign substances adhering to fiber components, organic matter outside the range of recovery, foreign substances, and the like are washed out by washing with washing water, and fiber components having sizes within the range of recovery are reliably recovered. The washed fiber components having sizes within the range of recovery are recovered from a recovery port 144.

Since the recovery device 103 recovers fiber components as described above, only fiber components having properties largely contributing to agglutination in a flocculation process in a later stage properties can be selectively recovered. The recovered fiber components are added as a dewatering aid to difficult-to-dewater sludge. It should be noted that the fiber components are not perishable because the fiber components do not contain easily decomposable organic matter, and may be temporarily stored where necessary. Moisture, foreign substances, and organic matter removed in the separation step 133 are sent to the gravity thickener 135.

The digester tank 137 receives thickened excess sludge sent from the final sedimentation tank 120 through the reaction tank 102, and further receives organic matter, foreign substances, and the like removed by the recovery device 103 and not to be used as a dewatering aid. Hardly decomposable organic matter such as plant fibers is recovered as a dewatering aid. Accordingly, only easily decomposable organic matter is sent to the digester tank 137. Thus, the period of digestion in the digester tank 137 becomes short, and the digester tank 137 can be made small. In the digester tank 137, organic matter in sludge is decomposed into digested sludge, carbon dioxide gas, methane gas, and the like by the action of anaerobic bacteria.

Digested sludge produced in the digester tank 137 is mixed with fiber components recovered by the recovery device 103, in a stage before the dewaterer 108. Digested sludge, in which organic matter has been decomposed in the digester tank 137, is short of fiber components to function as flocculation nuclei. The shortage of fiber components can be compensated for by adding and mixing fiber components recovered by the recovery device 103 to/into digested sludge.

Digested sludge having fiber components added thereto is stirred, with the addition of a flocculant as required, to form flocs and produce flocculated sludge. Fiber components recovered by the recovery device 103 are selectively recovered fibers having properties appropriate for flocculation. Accordingly, firm flocs can be formed, and the dewaterability of a dehydration region can be improved.

The flocculated sludge is sent to the dewaterer 8 to be dewatered. The dewaterer 108 may be any dewaterer such as a screw press, a centrifugal dewaterer, or a belt press.

Figure 17:
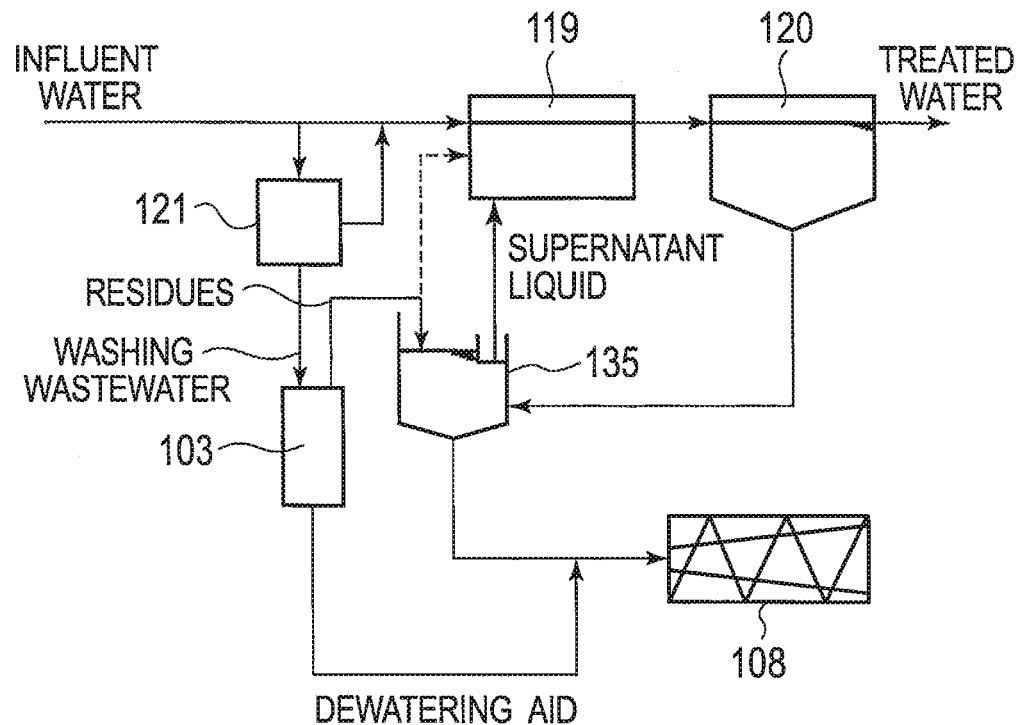
FIG. 17 is a diagram showing the sludge dehydration system and the flow of the sludge dehydration method according to the second embodiment of the present invention for the case where an OD process is employed.

FIG. 17 is a diagram showing the sludge dehydration system and the flow of the sludge dehydration method for the case where an OD process is employed in the sludge dehydration method according to the second embodiment. Influent water flowing into the treatment plant flows into the reaction tank 119 and is clarified by the action of microorganisms. Part of the influent water is sent to a solid-liquid separator 121 branching from an inflow channel of the reaction tank 119, and suspended matter in sewage is separated. Washing wastewater is transferred to the recovery device 103. Moreover, filtrate water is returned to an inflow side of a stage before the reaction tank 119. A dewatering aid is selectively separated and recovered from discharged water of suspended matter and the like transferred to the recovery device 103. The gravity thickener 135 thickens excess sludge transferred from the final sedimentation tank 120 and residues such as easily decomposable organic matter returned from the recovery device 103. Supernatant liquid in the gravity thickener 135 is sent to an inflow side of a stage before the reaction tank 119. Residues discharged from the recovery device 103 may be returned to the reaction tank 119. A dewatering aid recovered by the recovery device 103 is mixed with difficult-to-dewater excess sludge and the like thickened by the gravity thickener 135, and is dewatered by the dewaterer 108, with the addition of a polymer flocculant as required.

Moreover, though treatment by an OD process is explained as an example here, an example using an MBR process is also represented by a similar flow diagram in the case where the form of the reaction tank 119 is changed. It should be noted that in the case where MBR is employed, the final sedimentation tank 120 becomes unnecessary, supernatant liquid in the reaction tank 119 is discharged as treated water, and sludge is transferred to the gravity thickener 135 or, depending on circumstances, sent directly to the dewaterer 108.

Figure 18:
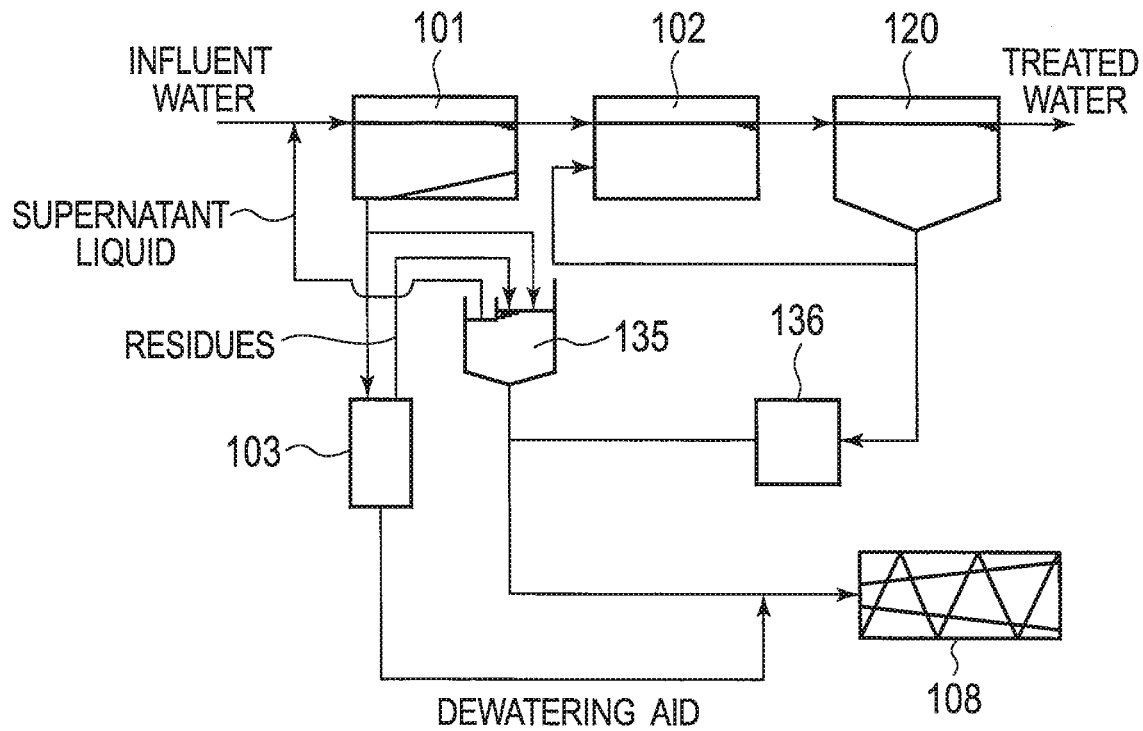
FIG. 18 is a diagram showing the sludge dehydration system and the flow of the sludge dehydration method according to the second embodiment of the present invention which are employed in the treatment of mixed raw sludge.

FIG. 18 is a diagram showing the sludge dehydration system and the flow of the sludge dehydration method according to the second embodiment for the case where mixed raw sludge being a mixture of raw sludge in the primary sedimentation tank 101 and excess sludge of the final sedimentation tank 120 is treated. This is a flow diagram showing the process of dewatering mixed raw sludge being a mixture of raw sludge taken out of the primary sedimentation tank 101 and excess sludge generated in the final sedimentation tank 120. Generally, at nighttime, the inflow amount of sewage is smaller than that of daytime, and therefore the amount of sludge taken out of the primary sedimentation tank 101 decreases. Accordingly, the percentage of excess sludge sent from the final sedimentation tank 120 increases, and therefore mixed sludge becomes difficult to dewater. Thus, using the sludge dehydration system and the sludge dehydration method of the present embodiment to dewater the mixed raw sludge improves dewatering efficiency.

The flow relating to a dewatering aid is similar to that of FIG. 14, a dewatering aid is recovered from the raw sludge taken out of the primary sedimentation tank 101 by the recovery device 103. Residues such as easily decomposable organic matter discharged from the recovery device 103 are returned to the gravity thickener 135 to be mixed with gravitationally thickened sludge (raw sludge) and mechanically thickened sludge (excess sludge), and are dewatered by the dewaterer 108. Fiber components are added to mixed raw sludge in a stage before the dewaterer 108.

In the fiber recovery device 3, the fiber recovery method, the sludge dehydration system, and the sludge dehydration method according to the second embodiment, fiber components in sewage flowing into the sewage treatment plant are effectively used as a dewatering aid. Since only fiber components suitable for a dewatering aid are selectively recovered and added to difficult-to-dewater sludge, sufficient flocculation can be performed with the recovered fiber components, and dewaterability can be improved. Further, there is no need to purchase and stockpile a dewatering aid. This can reduce cost and downsize the facility. Since fiber components are recovered from sewage which has just flown into the sewage treatment plant and are used, the second embodiment can be applied to various treatment plants irrespective of a sludge dehydration method.

Next, a third embodiment of the present invention will be described.

In a sludge dehydration system and a sludge dehydration method for sewage sludge according to the third embodiment, the total recovery amount TCA of a dewatering aid recovered from sludge (including sewage) generated in a sewage treatment process in a predetermined period CP is predicted, the total sludge amount TSA in a dewatering process is predicted, and the predicted total recovery amount PTCA is distributedly added according to the predicted total sludge amount PTSA. Thus, the stored amount of the dewatering aid is reduced to a minimum while the dewaterability of sludge is improved.

Figure 19:
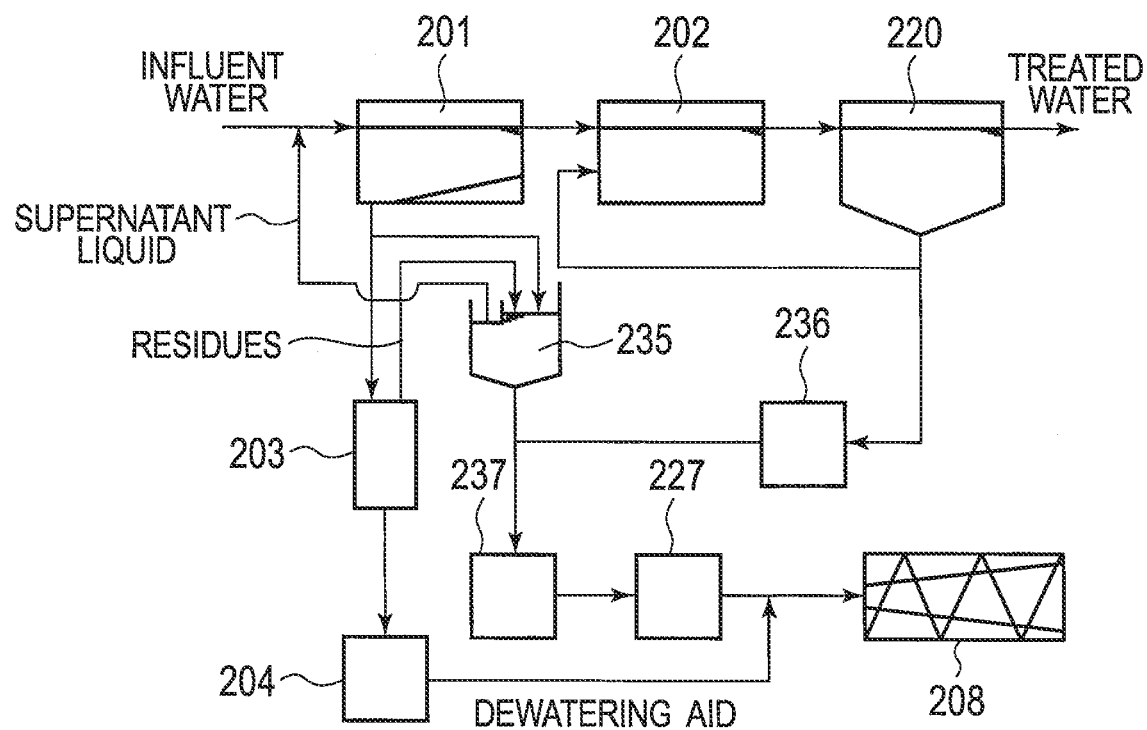
FIG. 19 is a diagram showing a sludge dehydration system and the flow of a sludge dehydration method according to a third embodiment of the present invention.

FIG. 19 is a diagram showing a sludge dehydration system and the flow of the sludge dehydration method for sewage sludge according to the third embodiment. This sludge dehydration system includes a primary sedimentation tank 201 for separating influent water flowing into the sewage treatment plant, a reaction tank 202 for clarifying organic matter in sewage separated in the primary sedimentation tank 201, a gravity thickener 235 for thickening raw sludge separated in the primary sedimentation tank 201, a recovery device 203 for taking out a predetermined amount of raw sludge in a stage before the gravity thickener 235 to selectively separate and recover a dewatering aid, a final sedimentation tank 220 for separating mixed liquid in the reaction tank 202, a mechanical thickener 236 for thickening excess sludge separated in the final sedimentation tank 220, a digester tank 237 for anaerobically digesting gravitationally thickened sludge and mechanically thickened sludge, a sludge storage tank 227 for temporarily storing difficult-to-dewater digested sludge, and a dewaterer 208 for performing solid-liquid separation on sludge in which the dewatering aid and digested sludge are mixed.

It should be noted that a position for taking out sludge from which a dewatering aid is recovered is not limited as long as the position is in a stage before the gravity thickener 235, e.g., in a passage before or after the primary sedimentation tank 201 or the primary sedimentation tank 201. Moreover, if necessary, a polymer flocculant may be added to sludge in which the dewatering aid and digested sludge are mixed. The dewaterer 208 may be a publicly known dewaterer such as a screw press, a belt press, or a centrifugal dewaterer.

Since sewage flows into the sewage treatment plant for 24 hours every day, sedimented sludge in sewage is transferred to the recovery device 203, and a dewatering aid in the sludge is recovered. The amount of the dewatering aid recovered in a continuous predetermined period CP defined in advance is referred to as a total recovery amount TCA. The inflow amount to the sewage treatment plant varies according to the season, the day of the week, and the weather, and the amount of the dewatering aid contained in the sludge also varies. Such information, including past information, is accumulated in the treatment plant as sludge information SI. The total recovery amount TCA of the dewatering aid to be recovered in the predetermined period CP is predicted based on actually measured values of initial several measurements of the amount of the recovered dewatering aid in the predetermined period CP and the sludge information SI. An actually measured value of a recovery amount is referred to as an actual recovery amount ACA, and a predicted value of a total recovery amount TCA is referred to as a predicted total recovery amount PTCA.

Residues left after the dewatering aid has been recovered in the predetermined period CP are thickened, returned to the digester tank 237, subjected to anaerobic digestion, and then dewatered in the dewaterer 208. It should be noted that in the sewage treatment plant, the dewaterer 208 does not operate every day. The operating time of the dewaterer 208 is determined as needed according to the amount of sludge generated in the sewage treatment process. Since the amount of sludge varies, the total sludge amount TSA of sludge to be dewatered in the predetermined period CP is predicted based on an actually measured value at an earlier stage in the predetermined period CP and sludge information SI. An actually measured value of the amount of sludge is referred to as an actual sludge amount ASA, and a predicted value of the total sludge amount TSA is referred to as a predicted total sludge amount PTSA. Generally, the dewaterer 208 operates according to the predicted total sludge amount PTSA on only predetermined dates and times defined in advance on which an observer is on duty.

Storing the dewatering aid extracted from sludge is necessary, but it is desirable to reduce the storage capacity as much as possible in view of arrangement and space in the treatment plant. Accordingly, it is important to accurately predict the recovery amount of the dewatering aid to be separated and recovered from sludge generated in the sewage treatment process in the predetermined period CP and the amount of sludge to be dewatered by the dewaterer 208, and to calculate the supply amount SA so that the total recovery amount TCA can be distributedly supplied according to the total sludge amount TSA while the stored amount DSA of the dewatering aid is maintained not more than a certain level.

The dewatering aid recovered from sewage sludge is hardly decomposable organic matter primarily composed of plant-derived fibrous matter. For example, toilet paper dissolved in sewage falls into the category of hardly decomposable organic matter. Moreover, as described previously, difficult-to-dewater sludge means sludge which exhibits poor dewaterability due to a great reduction in the content of fiber components acting as flocculation nuclei caused by biological treatment or the like. For example, digested sludge generated in the digester tank 237, OD excess sludge generated in the reaction tank 219 of an OD process, and the like fall into the category of difficult-to-dewater sludge. Sludge left after the extraction of hardly decomposable organic matter consists principally of easily decomposable organic matter. Easily decomposable organic matter originating from food residues is perishable and cannot be preserved for a long period of time, and is therefore returned to the digester tank 237 and subjected to anaerobic digestion. In the digester tank 237, the amount of hardly decomposable organic matter is small because the dewatering aid has been recovered. Accordingly, a reaction period of a digestion process can be shortened. This contributes to the improvement of the processing efficiency of the entire treatment plant.

When toilet paper is immersed in water, toilet paper does not dissolve, and fibers configured in the form of a sheet are merely untangled and dispersed. Accordingly, a large amount of fibers originating from toilet paper exist in sewage sludge.

In the third embodiment, fiber components in influent water flowing into the sewage treatment plant are recovered by the recovery device 203 so that fiber components in sludge may be utilized as a dewatering aid. The recovered fiber components are added to unflocculated difficult-to-dewater sludge and the like to function as flocculation nuclei. Adding dewatering aid having appropriate properties to sludge causes firm flocs to be formed and improves dewaterability.

Figure 20:
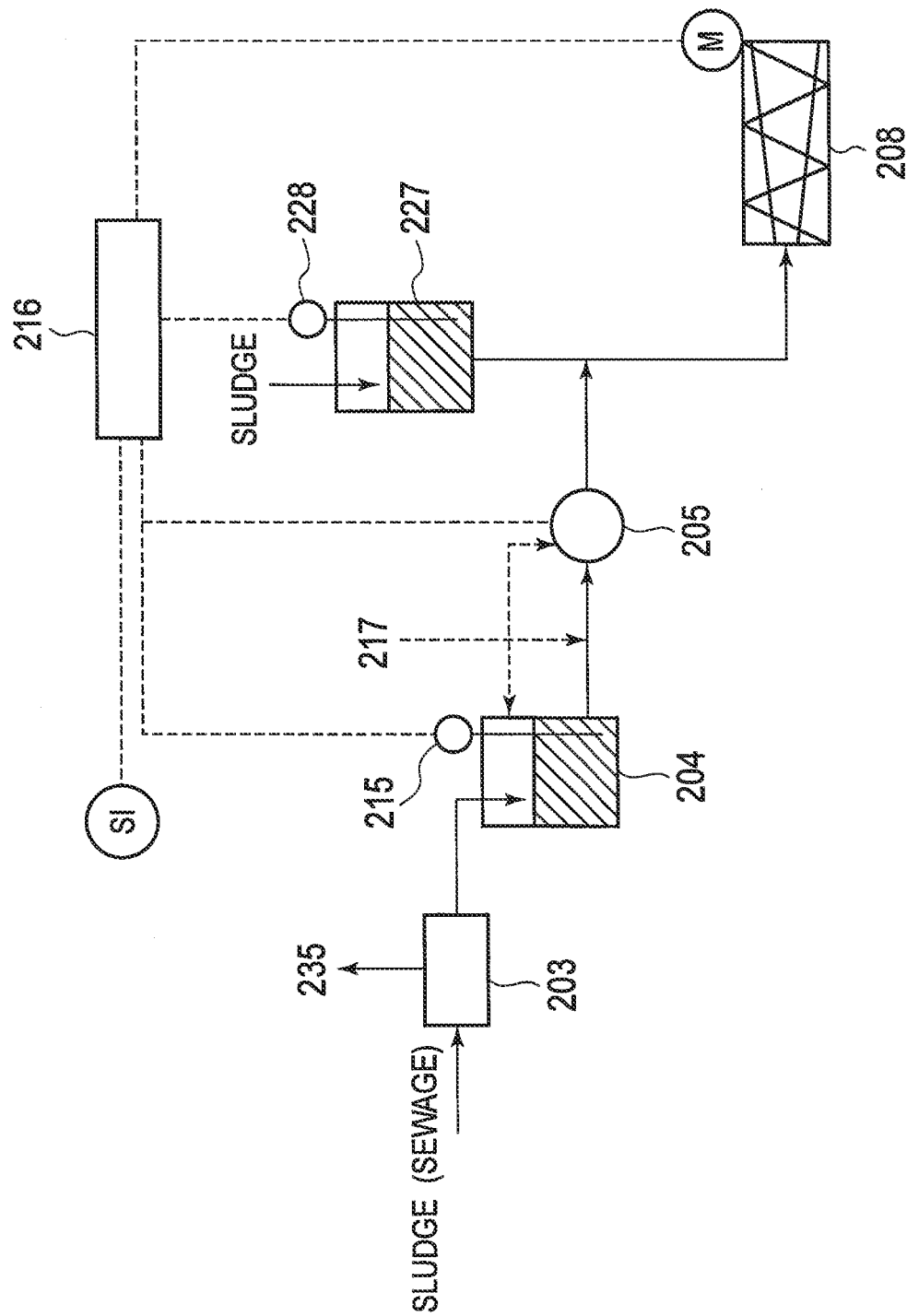
FIG. 20 is a diagram showing part of the sludge dehydration system and part of the flow of the sludge dehydration method according to the third embodiment of the present invention which are downstream from a recovery device.

FIG. 20 is a diagram showing part of the dehydration system and part of the flow of the dehydration method according to the third embodiment which are downstream from the recovery device 203. Sedimented and separated sludge is taken out of sewage flowing into the sewage treatment plant and transferred to the recovery device 203. In the recovery device 203, hardly decomposable organic matter in the sludge is selectively separated and discharged to an aid storage tank 204. Easily decomposable organic matter which is not recovered in the aid storage tank 204 is transferred from the recovery device 203 through the gravity thickener 235 to the digester tank 237. In the aid storage tank 204, the recovery amount of the dewatering aid is measured with a publicly known measuring device 215 such as a gravimeter or a level meter. Measurement data on the actual recovery amount ACA of the recovered dewatering aid is sequentially transmitted to a control device 216, and the control device 216 calculates a predicted total recovery amount PTCA predicted to be recovered in the predetermined period CP. The predicted total recovery amount PTCA is corrected and revised every time measurement data on the actual recovery amount ACA is transmitted.

Digested sludge is temporarily stored in the sludge storage tank 227. In the sludge storage tank 227, the amount of sludge is measured with a publicly known measuring device 228 such as a level meter. Measurement data on the actual sludge amount ASA of the store sludge is sequentially transmitted to the control device 216, and the control device 216 calculates a predicted total sludge amount PTSA predicted to be stored in the predetermined period CP. The predicted total sludge amount PTSA is corrected and revised every time measurement data on the actual sludge amount ASA is transmitted. It should be noted that the measuring device for measuring the amount of sludge may be provided in a sludge transfer tube, or the amount of sludge may be estimated from a dewatered cake discharged from the dewaterer 208.

The control device 216 calculates the supply amount SA of the dewatering aid based on the predicted total recovery amount PTCA and the predicted total sludge amount PTSA. A dewatering aid supply device 205 is controlled according to the calculated supply amount SA. At this time, a range defined in advance within which the stored amount DSA in the aid storage tank 204 is limited is inputted to the control device 216 in advance.

When the dewatering aid is supplied to difficult-to-dewater sludge by the supply device 205, injecting dilution water 217 facilitates the dewatering aid to be transferred.

FIG. 21 shows data on the recovery of a dewatering aid in a certain sewage treatment plant. Sewage containing organic matter flows into this sewage treatment plant for 24 hours every day, and sludge of an amount defined in advance is taken out of the primary sedimentation tank 201 and transferred to the recovery device 203. However, the concentration of sludge greatly varies according to the season, dates and times. In particular, the concentration of sludge is low on off-days, which are Saturday and Sunday, and the amount of solids is half of that of weekdays, which are Monday to Friday. Accordingly, the recovery amount of the dewatering aid primarily composed of fiber components being the hardly decomposable organic matter also decreases.

In this sewage treatment plant, easily decomposable organic matter which is not suitable for a dewatering aid is subjected to anaerobic digestion in the digester tank 237, and then digested sludge is dewatered by the dewaterer 208. In this sewage treatment plant, on Saturday and Sunday, since an inflow amount is small, digested sludge is not taken out of the digester tank 237 so that the operation of the dewaterer may be reduced to a minimum. Accordingly, the generated amount of digested sludge on Saturday and Sunday is zero on the data.

In view of the amount of sludge and the processing capacity of the dewaterer 208, this sewage treatment plant operates for only eight hours a day on weekdays and stops operating on off-days. The supply amount SA of the dewatering aid is calculated so that the dewatering aid of the total recovery amount TCA can be evenly supplied in the predetermined period CP according to the total sludge amount TSA. In this data, the dewatering aid of the total recovery amount TCA recovered for one week is supplied to the total sludge amount TSA to be dewatered in the week at an even addition rate.

Recovery Amount

The sludge dehydration system and the sludge dehydration method for sewage sludge according to the third embodiment will be described in detail along the data of FIG. 21. The predetermined period CP in which the dewatering aid is recovered is set as follows:

predetermined period: seven days from Saturday to next Friday

For sludge generated in a water treatment process, raw sludge is taken out of the primary sedimentation tank 201 of the sewage treatment plant and transferred to the recovery device 203. A predetermined amount of raw sludge may be regularly taken out several times, or the whole amount of raw sludge may be continuously taken out.

The recovered hardly decomposable organic matter is stored as a dewatering aid into the aid storage tank 204. The recovery amount of the dewatering aid stored into the aid storage tank 204 is measured with the publicly known measuring device 215 in real time, and measurement data on the actual recovery amount ACA is transmitted to the control device 216. Dilution water 217 may be injected into the aid storage tank 204 according to the actual recovery amount ACA of the dewatering aid. In the present embodiment, dilution water 217 is injected until the concentration becomes 3%.

The control device 216 calculates a predicted total recovery amount PTCA of the dewatering aid which can be recovered in the predetermined period CP, with reference to the actual recovery amount ACA and sludge information SI such as past measurement information and weather information. To accurately predict the predicted total recovery amount PCTA, measurement data on the actual recovery amount ACA is transmitted to the control device 216 as needed, and the control device 216 calculates the predicted total recovery amount PTCA while making corrections.

In the present embodiment, the recovery of the dewatering aid is started on Saturday. As shown in FIG. 21, the recovery amount of the dewatering aid decreases on off-days, which are Saturday and Sunday. This is because an inflow area of the certain sewage treatment plant from which this data has been extracted includes a large number of business districts, general offices are closed on Saturday and Sunday, and the sludge inflow amount from the business districts decreases. In contrast, in a sewage treatment plant having an inflow area around a residential area, the concentration of inflow sludge increases on Saturday and Sunday, the recovery amount of the dewatering aid is predicted to increase.

In the recovery device 203, only hardly decomposable organic matter in the taken sludge is separated and recovered to be stored into the aid storage tank 204. Residues (mainly composed of easily decomposable organic matter) left after the hardly decomposable organic matter has been extracted are returned to the digester tank 237 through the gravity thickener 235 arranged in a stage after the primary sedimentation tank 201, and are subjected to anaerobic digestion by a sewage treatment process.

Sludge Amount

In the present embodiment, sludge to be dewatered is stored in the sludge storage tank 227. The amount of sludge stored in the sludge storage tank 227 is measured with the publicly known measuring device 228 in real time, and measurement data on the actual sludge amount ASA is transmitted to the control device 216.

The control device 216 calculates a predicted total sludge amount PTSA generated in the predetermined period CP with reference to the actual sludge amount ASA and sludge information SI such as past measurement information and weather information. To accurately predict the predicted total sludge amount PTSA, measurement data on the actual recovery amount ACA is transmitted to the control device 216 as needed, and the control device 216 calculates the predicted total sludge amount PTSA while making corrections.

As in the case of the recovery amount, since the amount of generated sludge is small on Saturday and Sunday, the dewaterer 208 performs dewatering only for five days from Monday to Friday. The dewaterer 208 is a screw press 218 which can continuously perform dewatering.

Calculation of Supply Amount

The control device 216 calculates the supply amount SA of the dewatering aid so that the dewatering aid of the predicted total recovery amount PTCA calculated by the control device 216 may be evenly distributed and supplied to sludge of the predicted total sludge amount PTSA calculated by the control device 216. In the present embodiment, since the period in which the dewatering aid is recovered and the period in which sludge is stored are completely equal, the supply amount SA of the dewatering aid is always calculated based on the predicted total recovery amount PTCA and the predicted total sludge amount PTSA of latest data as needed. After calculating the supply amount SA of the dewatering aid, the control device 216 adjusts the dewatering aid supply device 205 to mix a predetermined amount of the dewatering aid with difficult-to-dewater sludge. It should be noted that a process including at least the above-described steps of calculating the predicted total recovery amount PTCA, calculating the predicted total sludge amount PTSA, and calculating the supply amount SA is referred to as a supply amount calculation process.

It should be noted that the supply amount SA may be evenly distributed and supplied to the actual sludge amount ASA to be dewatered in the predetermined period CP.

If the amount of solids flowing into the sewage treatment plant increases, the recovery amount of the dewatering aid which can be recovered therefrom also increases. At this time, since the amount of easily decomposable organic matter which is not suitable for a dewatering aid also increases, the amount of sludge to be dewatered by the dewaterer 208 also increases. The predicted total recovery amount PTCA of the dewatering aid to be recovered in the aid storage tank 204 shows an increasing tendency, but the predicted total sludge amount PTSA to be dewatered also shows an increasing tendency, and the supply amount SA of the dewatering aid also increases. Accordingly, the stored amount DSA of the aid storage tank 204 does not extremely increase, and therefore the aid storage tank does not require a large space.

Meanwhile, if the amount of solids flowing into the sewage treatment plant decreases, the recovery amount of the dewatering aid which can be recovered therefrom also decreases. At this time, since the amount of easily decomposable organic matter which is not suitable for a dewatering aid also decreases, the amount of sludge to be dewatered by the dewaterer 208 also decreases. The predicted total recovery amount PTCA of the dewatering aid to be recovered in the aid storage tank 204 shows a decreasing tendency, but the predicted total sludge amount PTSA to be dewatered also shows a decreasing tendency, and the supply amount SA of the dewatering aid also decreases. Accordingly, the stored amount DSA of the aid storage tank 204 does not extremely decrease, and therefore the water content does not become unstable in a dewatering process due to the shortage of the dewatering aid.

Figure 22:
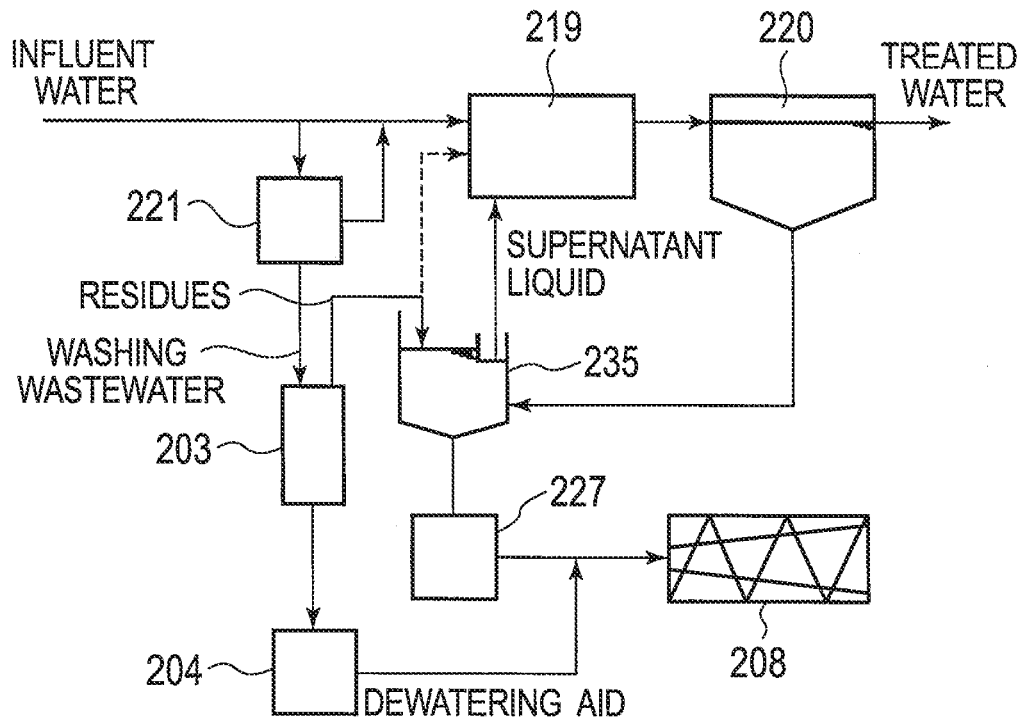
FIG. 22 is a diagram showing the sludge dehydration system and the flow of the sludge dehydration method according to the third embodiment of the present invention for the case where a primary sedimentation tank is not arranged in the sewage treatment plant.

FIG. 22 is a diagram showing the sludge dehydration system and the flow of the sludge dehydration method for the case where a primary sedimentation tank is not arranged in the sewage treatment plant. Specifically, this is applicable to a treatment method in which an OD process or MBR (membrane bioreactor process) is employed. Influent water flowing into the sewage treatment plant flows into the reaction tank 219 and is clarified by the action of microorganisms. Part of the influent water is introduced into a solid-liquid separator 221 branching from an inflow channel of the reaction tank 219, and suspended matter in sewage is separated. Washing wastewater is transferred to the recovery device 203. Moreover, filtrate water is returned to an inflow side of a stage before the reaction tank 219. A dewatering aid is selectively separated and recovered from discharged water such as suspended matter transferred to the recovery device 203. The gravity thickener 235 thickens excess sludge transferred from the final sedimentation tank 220 and residues such as easily decomposable organic matter returned from the recovery device 203. Supernatant liquid in the gravity thickener 235 is sent to an inflow side of a stage before the reaction tank 219. Residues discharged from the recovery device 203 may be returned to the reaction tank 219. Difficult-to-dewater excess sludge and the like thickened by the gravity thickener 235 are sent to the sludge storage tank 227 to be mixed with the dewatering aid recovered by the recovery device 203, and are dewatered by the dewaterer 208, with the addition of a polymer flocculant as required. It should be noted that in the case where MBR is employed, the final sedimentation tank 220 becomes unnecessary, supernatant liquid in the reaction tank 219 is discharged as treated water, and sludge is transferred to the gravity thickener 235.

Figure 23:
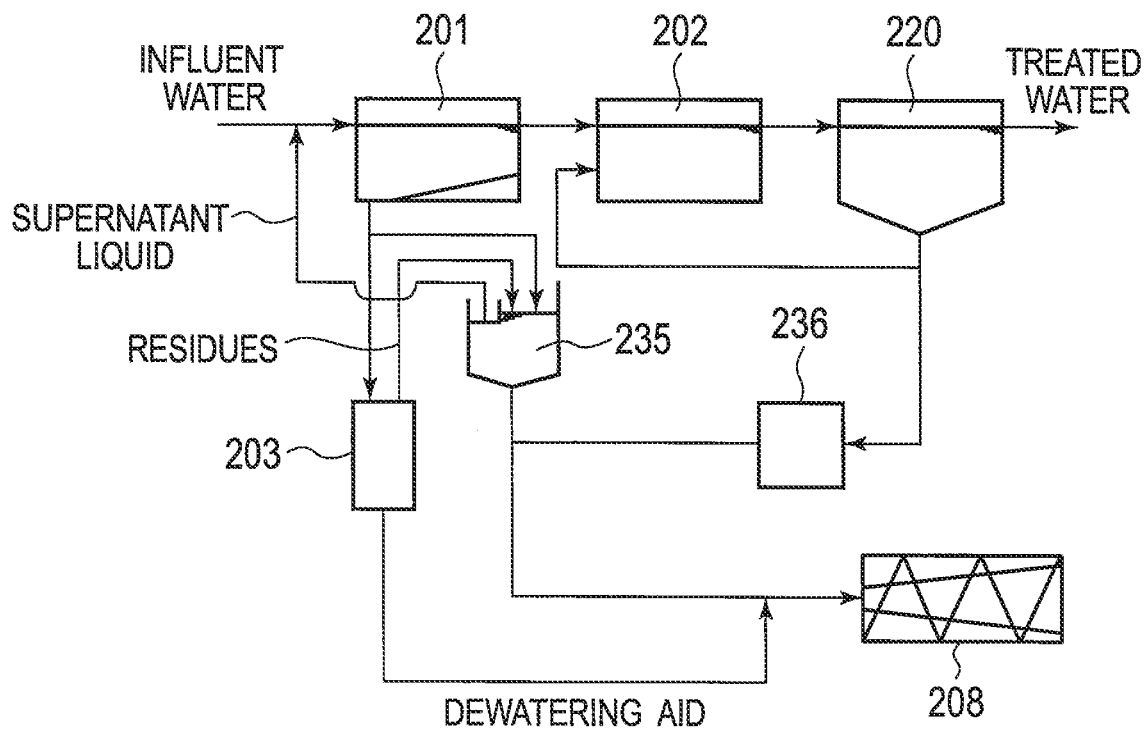
FIG. 23 is a diagram showing the sludge dehydration system and the flow of the sludge dehydration method according to the third embodiment of the present invention which are employed in the treatment of mixed raw sludge.

FIG. 23 is a diagram showing the sludge dehydration system and the flow of the sludge dehydration method for the case where mixed raw sludge being a mixture of raw sludge in the primary sedimentation tank 201 and excess sludge in the final sedimentation tank 220 is treated. Specifically, this is applicable to the flow of FIG. 19 with the digester tank removed. Generally, at nighttime, the inflow amount of sewage is smaller than that of daytime, and therefore the amount of sludge taken out of the primary sedimentation tank 201 decreases. Accordingly, the percentage of excess sludge sent from the final sedimentation tank 220 increases, and therefore mixed sludge becomes difficult to dewater. Thus, using the sludge dehydration system and the sludge dehydration method of the present embodiment to dewater the mixed raw sludge improves dewatering efficiency. The flow relating to the dewatering aid is similar to that of FIG. 19, and the dewatering aid is recovered from raw sludge taken out of the primary sedimentation tank 201 by the recovery device 203. Residues such as easily decomposable organic matter discharged from the recovery device 203 are returned to the gravity thickener 235 to be mixed with gravitationally thickened sludge (raw sludge) and mechanically thickened sludge (excess sludge), and are dewatered by the dewaterer 208. The dewatering aid is added to mixed raw sludge in a stage before the dewaterer 208.

In the sludge dehydration system and the sludge dehydration method for sewage sludge according to the third embodiment, fiber components in sludge obtained by sedimenting and separating sewage flowing into the sewage treatment plant are effectively used as a dewatering aid. This allows a dewatering aid to be procured from waste in the treatment plant. This reduces running cost, and makes it possible to downsize facility such as a storage tank for the dewatering aid because the dewatering aid is used according to a predicted amount of sludge to be generated while the recovery amount of the dewatering aid is being predicted. Moreover, in the sludge dehydration system and the sludge dehydration method according to the third embodiment, hardly decomposable organic matter in sludge is effectively used as a dewatering aid in a sludge dewatering process in the treatment system to be added to difficult-to-dewater sludge generated in the treatment system. Thus, a dewatered cake with a stable low water content can be produced, and an environment-conscious system and method in which dewatered cake treatment is inexpensive and easy can be obtained.

While the present invention has been described above based on the embodiments, the present invention is not limited thereto. The configurations of the respective parts can be replaced by any other configurations having the same functions.

What is claimed is:

1. A sludge dehydration method comprising:
    recovery by recovering in a recovery device specific material as a dewatering aid from sludge generated in a sewage treatment;
    an operating time determination by determining an operating time of a dewaterer as needed according to an amount of the sludge generated in the sewage treatment,
    wherein the recovery includes:
        preparation by fragmenting a solid in the sludge to obtain prepared sludge;
        separation by separating hardly decomposable organic matter and easily decomposable organic matter from the prepared sludge;
        extraction by continuously extracting specific hardly decomposable organic matter that has specific properties as the dewatering aid from the hardly decomposable organic matter that has been separated; and
        supplying the dewatering aid from the recovery device to a dewatering target sludge in a mixing tank according to the operating time of the dewaterer determined as needed in the operating time determination; and
    dewatering with the dewaterer by performing solid-liquid separation on a mixed sludge in which the dewatering aid recovered in the recovery and the dewatering target sludge have been mixed in the mixing tank.

2. The sludge dehydration method according to claim 1, wherein the preparation comprises performing preparation to obtain the prepared sludge having properties allowing fiber components being the hardly decomposable organic matter and the easily decomposable organic matter to be separated from each other.

3. The sludge dehydration method according to claim 2, wherein the preparation comprises performing preparation to obtain the prepared sludge by adding dilution water to the solid.

4. The sludge dehydration method according to claim 2, wherein the preparation comprises performing preparation to obtain the prepared sludge by crushing the solid into fine pieces.

5. The sludge dehydration method according to claim 1, wherein the separation comprises washing the solid prepared in the preparation with washing water and removing fiber components smaller than the hardly decomposable organic matter having the specific properties.

6. The sludge dehydration method according to claim 1, wherein the recovery further comprises, in a stage before the preparation removing foreign substances larger than the hardly decomposable organic matter having the specific properties.

7. The sludge dehydration method according to claim 1, wherein the hardly decomposable organic matter having the specific properties is fiber components having fiber lengths of 0.1 mm to 5 mm and fiber diameters of 1 μm to 50 μm.

8. The sludge dehydration method according to claim 1, wherein the dewatering target sludge is one of OD (oxidation ditch) excess sludge or digested sludge being sludge in which fiber components are reduced.

9. The sludge dehydration method according to claim 1, further comprising a supply amount calculation,
    wherein the supply amount calculation comprises:
        calculating a predicted total recovery amount of the dewatering aid to be recovered in a continuous predetermined period set in advance in the recovery;
        calculating a predicted total sludge amount of the dewatering target sludge to be dewatered in the continuous predetermined period set in advance in the dewatering; and
        calculating a supply amount for distributedly supplying the dewatering aid of the predicted total recovery amount to the dewatering target sludge of the predicted total sludge amount.

10. The sludge dehydration method according to claim 1, wherein
    the recovery comprises:
    providing a grinder comprising a stationary disk having a first conically recessed portion formed in the stationary disk from an outer circumferential portion toward a center of the stationary disk, and a rotatable disk having a second conically recessed portion formed in the rotatable disk from an outer circumferential portion toward a center of the rotatable disk and facing the first conically recessed portion, and operating the grinder to fragment the solid in the sludge and prepare fiber components entangled with each other into fiber components having fiber lengths of 0.1 mm to 0.5 mm and fiber diameters of 1 μm to 50 μm to obtain the prepared sludge;
    providing a separator, and operating the separator to separate the hardly decomposable organic matter being fibrous matter and the easily decomposable organic matter from the prepared sludge; and
    providing an extractor and operating the extractor to continuously extract the specific hardly decomposable organic matter having the specific properties being fiber components having fiber lengths of 0.1 mm to 5 mm and fiber diameters of 1 μm to 50 μm as the dewatering aid from the hardly decomposable organic matter separated by the separator.

11. The sludge dehydration method according to claim 1, wherein
    the recovery comprises:
    providing a grinder comprising a stationary disk having a first conically recessed portion formed in the stationary disk from an outer circumferential portion toward a center of the stationary disk, and a rotatable disk having a second conically recessed portion formed in the rotatable disk from an outer circumferential portion toward a center of the rotatable disk and facing the first conically recessed portion with a gap of 1 mm or less between outer circumferential edges of the stationary disk and the rotary disk, and operating the grinder to rotate the rotary disk, grind and fragment the solid in the sludge, untangle the hardly decomposable organic matter being fiber components and the easily decomposable organic matter entangled with each other, untangle the fiber components entangled with each other, and prepare the untangled fiber components into fiber components having fiber lengths of 0.1 mm to 0.5 mm and fiber diameters of 1 μm to 50 μm to obtain prepared sludge;

providing a separator, and operating the separator to separate the hardly decomposable organic matter being fibrous matter and the easily decomposable organic matter from the prepared sludge; and providing an extractor and operating the extractor to continuously extract the specific hardly decomposable organic matter having the specific properties being the fiber components having the fiber lengths of 0.1 mm to 5 mm and the fiber diameters of 1 μm to 50 μm as the dewatering aid from the hardly decomposable organic matter separated by the separator.

12. The sludge dehydration method according to claim 11, wherein the preparation comprises performing preparation to obtain the prepared sludge having properties allowing the fiber components being the hardly decomposable organic matter and the easily decomposable organic matter to be separated from each other.

13. The sludge dehydration method according to claim 12, wherein the preparation comprises performing preparation to obtain the prepared sludge by adding dilution water to the solid.

14. The sludge dehydration method according to claim 12, wherein the preparation comprises performing preparation to obtain the prepared sludge by crushing the solid into fine pieces.

15. The sludge dehydration method according to claim 11, wherein the separation comprises washing the solid prepared in the preparation with washing water and removing fiber components smaller than the hardly decomposable organic matter having the specific properties.

16. The sludge dehydration method according to claim 11, wherein the recovery further comprises, in a stage before the preparation, removing foreign substances larger than the hardly decomposable organic matter having the specific properties.

17. The sludge dehydration method according to claim 11, wherein the dewatering target sludge is one of OD (oxidation ditch) excess sludge or digested sludge being sludge in which fiber components are reduced.

18. The sludge dehydration method according to claim 11, further comprising a supply amount calculation, wherein the supply amount calculation comprises:

calculating a predicted total recovery amount of the dewatering aid to be recovered in a continuous predetermined period set in advance in the recovery;

calculating a predicted total sludge amount of the dewatering target sludge to be dewatered in the continuous predetermined period set in advance in the dewatering; and calculating a supply amount for distributedly supplying the dewatering aid of the predicted total recovery amount to the dewatering target sludge of the predicted total sludge amount.

19. A sludge dehydration method comprising:

recovery by recovering in a recovery device specific material as a dewatering aid from sludge generated in a sewage treatment;

a supply amount calculation including:

calculating a predicted total recovery amount of the dewatering aid to be recovered in a continuous predetermined period set in advance in the recovery, based on an actual recovered amount of the dewatering aid and a sludge information being an information of an amount of the dewatering aid contained in an influent water which varies according to a season, a day of a week, and a weather;

calculating a predicted total sludge amount of a dewatering target sludge to be dewatered in the continuous predetermined period set in advance in a dewatering, based on an actual sludge amount of the sludge generated in the sewage treatment and the sludge information; and calculating a supply amount for distributedly supplying the dewatering aid of the predicted total recovery amount to the dewatering target sludge of the predicted total sludge amount, wherein the recovery includes:

preparation by fragmenting a solid in the sludge to obtain prepared sludge;

separation by separating hardly decomposable organic matter and easily decomposable organic matter from the prepared sludge;

extraction by continuously extracting specific hardly decomposable organic matter that has specific properties as the dewatering aid from the hardly decomposable organic matter that has been separated; and supplying the dewatering aid from the recovery device to the dewatering target sludge in a mixing tank according to an operating time of a dewaterer determined as needed based on the predicted total recovery amount calculated in the supply amount calculation; and dewatering with the dewaterer by performing solid-liquid separation on a mixed sludge in which the dewatering aid recovered in the recovery and the dewatering target sludge have been mixed in the mixing tank.

* * * * *